United States Patent
Jones et al.

(10) Patent No.: US 6,772,784 B1
(45) Date of Patent: Aug. 10, 2004

(54) PROPORTIONAL PRESSURE REGULATOR HAVING POSITIVE AND NEGATIVE PRESSURE DELIVERY CAPABILITY

(75) Inventors: Thomas R. Jones, Walled Lake, MI (US); Zafar A. Khan, Farmington, MI (US)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 10/365,930

(22) Filed: Apr. 11, 2003

(51) Int. Cl.[7] .................................................. G05D 16/20
(52) U.S. Cl. .................... 137/102; 137/270; 137/596.17
(58) Field of Search ................................ 137/102, 270, 137/596.17

(56) References Cited

U.S. PATENT DOCUMENTS

| | | | |
|---|---|---|---|
| 3,731,435 A | 5/1973 | Boettcher et al. ............. 51/129 |
| 4,241,750 A | * 12/1980 | Furuse et al. ................ 137/102 |
| 4,918,870 A | 4/1990 | Torbert et al. ............. 51/131.3 |
| 4,947,970 A | 8/1990 | Miller et al. ............. 192/0.076 |
| 5,104,828 A | 4/1992 | Morimoto et al. ........... 437/225 |
| 5,205,082 A | 4/1993 | Shendon et al. .............. 51/283 |
| 5,325,636 A | 7/1994 | Attanasio et al. ........... 51/165.9 |
| 5,499,647 A | 3/1996 | Robert ......................... 137/12 |
| 5,716,258 A | 2/1998 | Metcalf ....................... 451/41 |
| 5,879,127 A | 3/1999 | Grunes et al. ........... 414/744.6 |
| 6,035,878 A | 3/2000 | Adams et al. ................. 137/1 |
| 6,056,008 A | 5/2000 | Adams et al. ........... 137/487.5 |
| 6,148,837 A | 11/2000 | Irokawa et al. ................ 137/1 |
| 6,164,323 A | 12/2000 | Smith et al. ................ 137/554 |
| 6,171,066 B1 | 1/2001 | Irokawa et al. ............. 417/44.2 |
| 6,178,997 B1 | 1/2001 | Adams et al. ........... 137/487.5 |
| 6,319,106 B2 | 11/2001 | Numoto ....................... 451/288 |

* cited by examiner

Primary Examiner—Gerald A. Michalsky
(74) Attorney, Agent, or Firm—Bliss McGlynn, P.C.

(57) ABSTRACT

A proportional pressure regulator assembly having a main body with a first inlet adapted for fluid communication with supply of positive pneumatic pressure, a second inlet adapted for fluid communication with a supply of negative pneumatic pressure, an outlet adapted for fluid communication with a pneumatically actuated device, and an exhaust port is provided. A fill regulator valve is included that is adapted to regulate the supply of positive pressure. A vacuum regulator valve is included that is adapted to regulate the supply of negative pressure. An exhaust valve is included that is operable to exhaust pressure from the outlet. A control circuit assembly is also provided that is adapted to receive a command signal and a feedback signal and to regulate the amount of positive pneumatic pressure through the fill regulator valve or the amount of negative pneumatic pressure through the vacuum regulator valve in response to the feedback signal.

20 Claims, 14 Drawing Sheets

NORMALLY CLOSED

PROPORTIONAL PRESSURE REGULATOR HAVING POSITIVE AND NEGATIVE PRESSURE DELIVERY CAPABILITY

BACKGROUND OF THE INVENTION

1. Field of the Invention

The invention relates, generally, to pressure regulators and, more specifically, to a proportional pressure regulator having the capability to deliver both negative and positive pressure, as well as providing a system exhaust.

2. Description of the Related Art

Pressure regulators are well known in the art and are employed in numerous environments to regulate a pneumatic supply pressure down to a predetermined system pressure. The system pressure is then supplied to operate various pneumatically actuated devices. In the past, a regulated system pressure was achieved through the use of a purely mechanical arrangement within the regulator, often with the assistance of a pressure feedback line returned to the regulator from the output side.

Some types of pneumatic systems still utilize mechanical regulators where course regulation and/or large volume pneumatic control is involved. However, where accuracy and fine regulatory control of pneumatic system pressure is required, regulators have rapidly evolved. The current state of the art provides pressure regulators that include an electrically controlled actuator, most often a solenoid, to regulate the output pressure. Pressure feedback is also utilized for more responsive control. In this case, a transducer may be employed to sense pressure and convert it to an electrical signal that is used by a feedback control circuit to assist in regulating the output. In this manner, the system pressure is regulated about a predetermined setpoint using feedback measurements from the particular process involved or the downstream output pressure.

Regulators of this type are well known and are sometimes referred to in the related art as proportional pressure regulators. The term "proportional" is used in the sense that if a difference is measured between a desired predetermined output setpoint and the actual downstream pressure, then the regulator changes, and thereby controls, the output pressure in "proportion" to that difference. Refinements in proportional regulators have included the use of digital circuits that have the capability to employ sophisticated control algorithms to more precisely control the regulator. The proportional pressure regulators with digital electronic control circuits use the feedback signal to electronically determine a difference or "error" between the desired output pressure setpoint and the actual output pressure.

More sophisticated digital control circuits use a control algorithm along with other system inputs to generate an overall control or scheme that operatively controls the regulator to adjust, or vary, the output pressure in an attempt to resolve the "error" and return the output to the predetermined setpoint. These known digital control schemes often employ complex calculations for error resolution, as evidenced in U.S. Pat. No. 6,178,997 B1 to Adams et al, which discloses an "Intelligent Pressure Regulator". The Adams '997 regulator has a PID (proportional-integral-derivative) controller that calculates the mathematical integral and derivative of the proportional error and employs the results of these calculations in its control algorithm. A PID controller uses the current value of the error to calculate both the integral of the error over a recent time interval, and the current derivative of the error signal. The PID controller then sums the error with the results of these calculations to determine not only the required amount of adjustment necessary, but also the duration of the adjustment to avoid overshoot of the setpoint.

Proportional pressure regulating devices have evolved to include regulating systems for advanced applications that require complex pressure sensing and monitoring, and equally complex regulating schemes. These pressure regulating systems have the capability to not only produce an accurate regulation of a constant predetermined setpoint, but to also respond to system sensors and dynamically vary the pressure setpoint and regulate the system pressure to it, even as the setpoint changes during the operation of the process. For example, regulator systems of this type may be employed in connection with devices used to polish the surface of semiconductor wafers. A polishing pad is pneumatically controlled so as to apply a predetermined force to the surface of the semiconductor wafer during the polishing process. In these circumstances, it is desirous to maintain a certain predetermined downward force of the polishing device to the wafer surface, while countering various dynamic physical effects that make the applied downward force a constantly varying value.

In some other particular processes and working environments, it is further desirable to have a pressure regulating system that not only has variable setpoint proportional regulation for control of system pressure in a positive pressure range, as described above, but one that also has variable setpoint proportional regulation to control system pressure in the negative (vacuum) pressure range. For some processes, this can offer greater accuracy of pneumatic control by providing a variable pressure setpoint of the system pressure that can be readily moved between positive and negative supply pressures for any given active device. For example, the highly precise manufacturing process involving the polishing of silicone wafers for use as integrated circuit chips, as well the polishing processes for disk media, such as CDs, DVDs, and the like, often use both negative and positive regulated pressures to operate and control the various precision mechanisms involved. U.S. Pat. No. 5,716,258 to Metcalf and U.S. Pat. Nos. 6,203,414 and 6,319,106 to Numoto disclose devices for use in silicone wafer polishing processes that rely on variable and precisely regulated positive and negative pressures to provide extremely fine control of the polishing procedure.

In applications such as these, the pressure regulating system must control each active pneumatic component in both positive and negative pressures. Systems known the related art require separate proportional regulator valves to effect control in both positive and negative pressures. The separate proportional regulators are each distinct and are selectively employed remote from one another. Thus, for each active pneumatic device, the separate regulators must be incorporated at various positions relative to one another in the system and must be interconnected via conduits or other flow passages. Additionally, the positive and negative regulators each have a separate electronic control circuitry, operatively connected to each other, to coordinate the positive and negative pressure regulating functions. While these separate components have generally worked well in the past, there remains an ongoing need in the art to simplify pneumatic systems and thereby lower costs of manufacture and/or assembly by eliminating separate components, shortening flow paths and thereby reducing related hardware.

The disadvantages apparent with the conventional complexity of these positive and negative pressure regulated systems are further compounded when efforts have been made to increase the accuracy in these systems. Specifically, while variable setpoint proportional regulation of the positive and negative system pressures is an effective control means for some process applications, the response times and accuracy of control can be further enhanced by additionally providing an exhaust, or vent capability to the pneumatic regulating scheme.

U.S. Pat. No. 6,113,480 to Hu et al discloses a wafer polishing apparatus that uses negative and positive pressure with an exhaust vent to control the polishing procedure. The use of an exhaust vent, as in the Hu '480 patent, decreases the response time of the pneumatic regulating circuit by providing a rapid and almost instantaneous reduction or complete removal of the supplied pressure when needed. This allows for very fast control changes from one pressure to the other, as in the case of changing from a regulated positive pressure to a negative pressure, or vice versa. Thus, the controlled pneumatic devices can be more accurately and finely controlled in precision operations.

The exhaust vent is also useful when it is necessary to proportionally decrease, but not reverse, the applied pressures. In these cases, whether the controller is varying the setpoint or regulating pressure, actuating the exhaust vent will rapidly drop the applied pressure to the desired level, rather than having to merely rely on the pressure to fall off by itself when the applied pressure is proportionally decreased. This function maybe employed in connection with both the positive and the negative proportional pressure regulation.

Regardless of how an exhaust vent is employed in conjunction with these regulators and regulating systems, when used with a sophisticated and complex process, such as shown in the Hu '480 patent, these systems must still utilize numerous separate components, hardware and support elements of their non-vented counterparts. Therefore, despite the great improvements in accuracy and efficiency in pneumatic pressure regulating systems presently known in the related art, they remain highly complex assemblies. In fact, the systems that employ the variable setpoint proportional pneumatic regulation devices mentioned above require so many associated components and hardware that their complexity and size often becomes a limiting factor in their application. Thus, there remains an ongoing need in the art to simplify these proportional pneumatic pressure regulator systems, to lower costs of their manufacture and/or assembly by eliminating separate components, to reduce related hardware and to shorten the inherently lengthy flow paths commonly employed in the regulator systems known in the related art. Furthermore, there remains a need in the art for a regulator system that employs a control circuitry that can effectively, efficiently, and accurately control positive pressure, negative pressure, and venting functions of an integrated regulating system.

SUMMARY OF THE INVENTION AND ADVANTAGES

The present invention overcomes the disadvantages of the related art in a proportional pressure regulator assembly having a main body with a first inlet adapted for fluid communication with a supply of positive pneumatic pressure, a second inlet adapted for fluid communication with a supply of negative pneumatic pressure, at least one outlet adapted for fluid communication with at least one pneumatically actuated device, and an exhaust port. A fill regulator valve is provided that is in fluid communication with the first inlet port and the outlet and that is adapted to regulate the supply of positive pressure to a predetermined value from the first inlet to a pneumatically actuated device when the fill regulator valve is actuated. A vacuum regulator valve is provided that is in fluid communication with the second inlet port and the outlet and that is adapted to regulate the supply of negative pressure to a predetermined value from the second inlet to a pneumatically actuated device when the vacuum regulator valve is actuated. An exhaust valve is provided that is in fluid communication with the outlet and is operable to exhaust pressure from the outlet when the exhaust valve is actuated. Therefore, the proportional pressure regulator of the present invention combines and centralizes all the functions of existing systems into a single integrated assembly thereby reducing the number of components and simplifying the overall structure.

The proportional pneumatic pressure regulator assembly of the present invention also overcomes the drawbacks of conventional regulation systems by providing a control circuit assembly that is adapted to receive a command signal and actuate either the fill regulator valve, the vacuum regulator valve, or the exhaust valve to dynamically set the output pressure at a specific value, or setpoint, in response to the command signal. The control circuit assembly is further adapted to receive a feedback signal and regulate the amount of positive pneumatic pressure through the fill regulator valve and the amount of negative pneumatic pressure through the vacuum regulator valve about the desired setpoint in response to the feedback signal. The proportional pressure regulator of the present invention provides a centralized electronic control for the regulation of positive, negative, and exhaust pressures, thereby eliminating the individual controls of conventional systems and their associated components.

Thus, the proportional pressure regulator of the present invention includes an integrated regulator assembly which provides either a positive pressure, a negative pressure, or exhaust venting functions. In addition, the present invention is directed toward a proportional pressure regulator assembly having a control circuit assembly that dynamically establishes a variable output setpoint in response to a command signal while proportionally regulating the output pressure about the setpoint in response to a feedback signal. This capability has application in a number of industrial settings where providing a combination of positive pressure, negative pressure, and exhaust capability with accurate regulation are critical to the highly accurate control of the production process. For example, the extreme accuracy required in the manufacture and polishing of silicon wafers for the production of integrated circuits or the production and polishing of disk media, such as hard drive disks, CD-ROMs, and DVDs all require systems that can provide positive pressure, negative pressure, and exhaust venting along with precise control. The present invention is highly advantageous in these or similar environments where its integrated design simplifies the complex pneumatically actuated systems and allows for smaller, more tightly integrated assemblies, ease of maintenance, and reduced costs. In this way, the proportional pressure regulator assembly of the present invention results in increased efficiency, accuracy, and cost savings in the production process.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
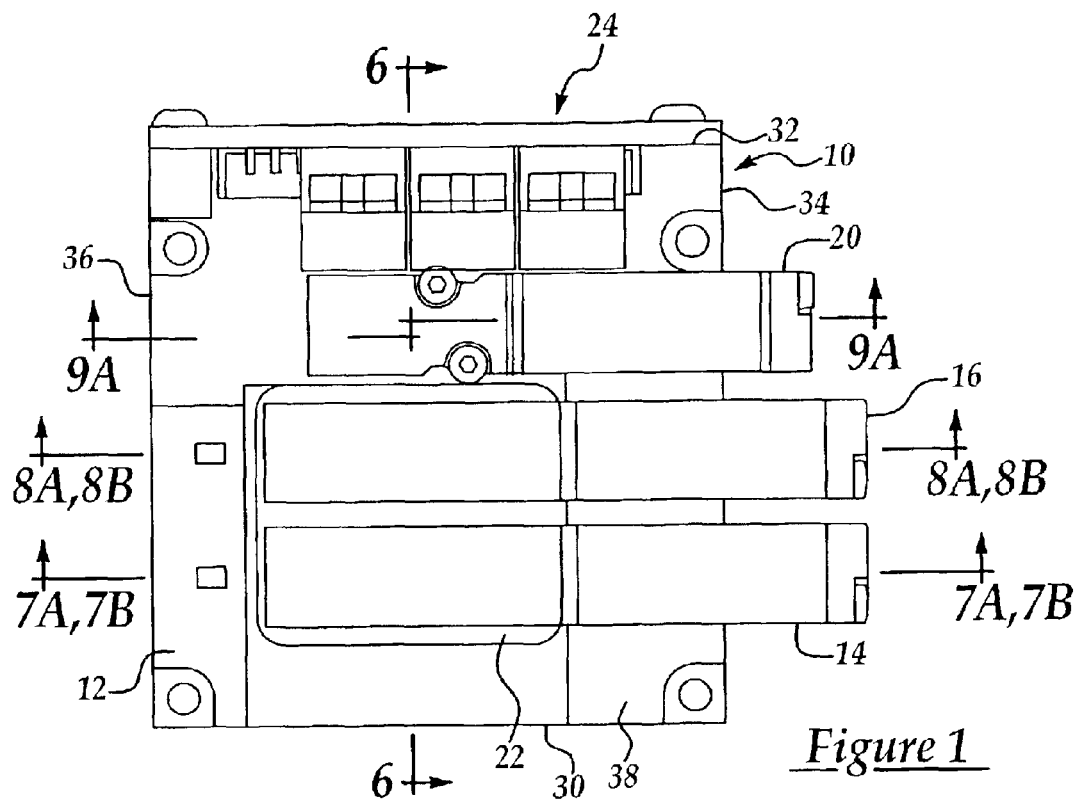
FIG. 1 is a top view of the proportional pressure regulator assembly of the present invention.
Figure 2:
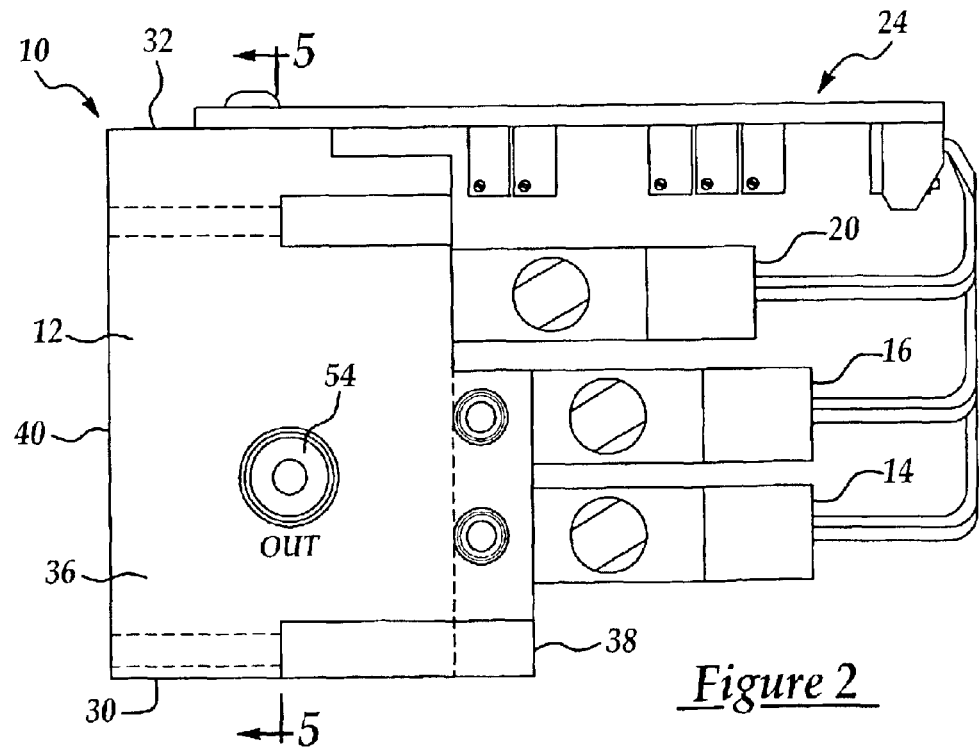
FIG. 2 is side view of the proportional pressure regulator assembly of the present invention.
Figure 3:
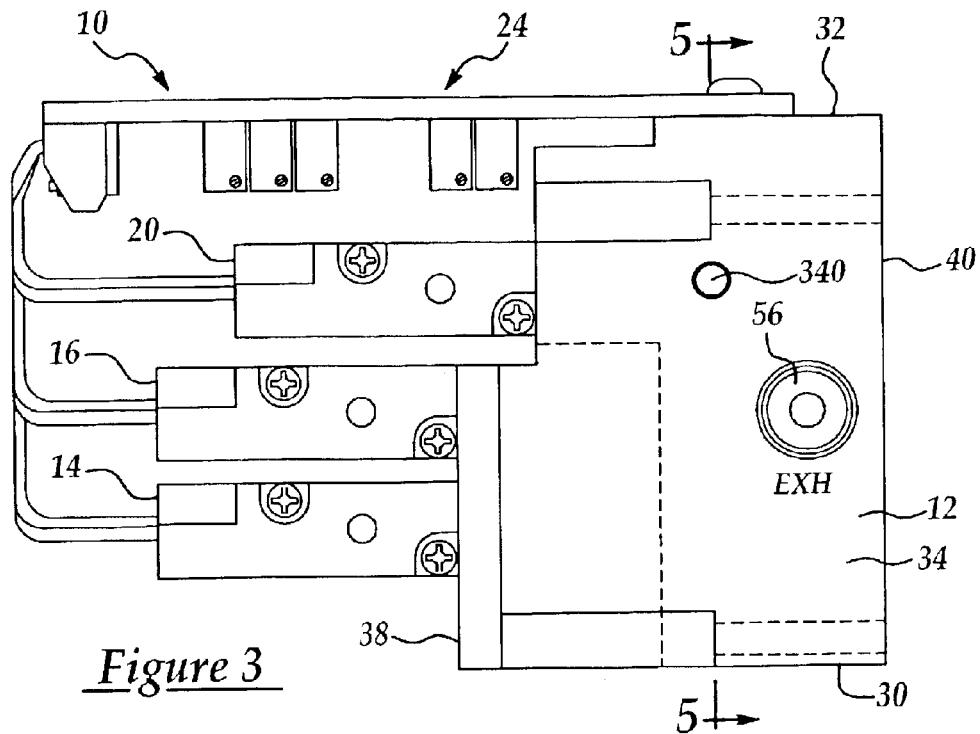
FIG. 3 is another side view of the proportional pressure regulator assembly of the present invention.
Figure 4:
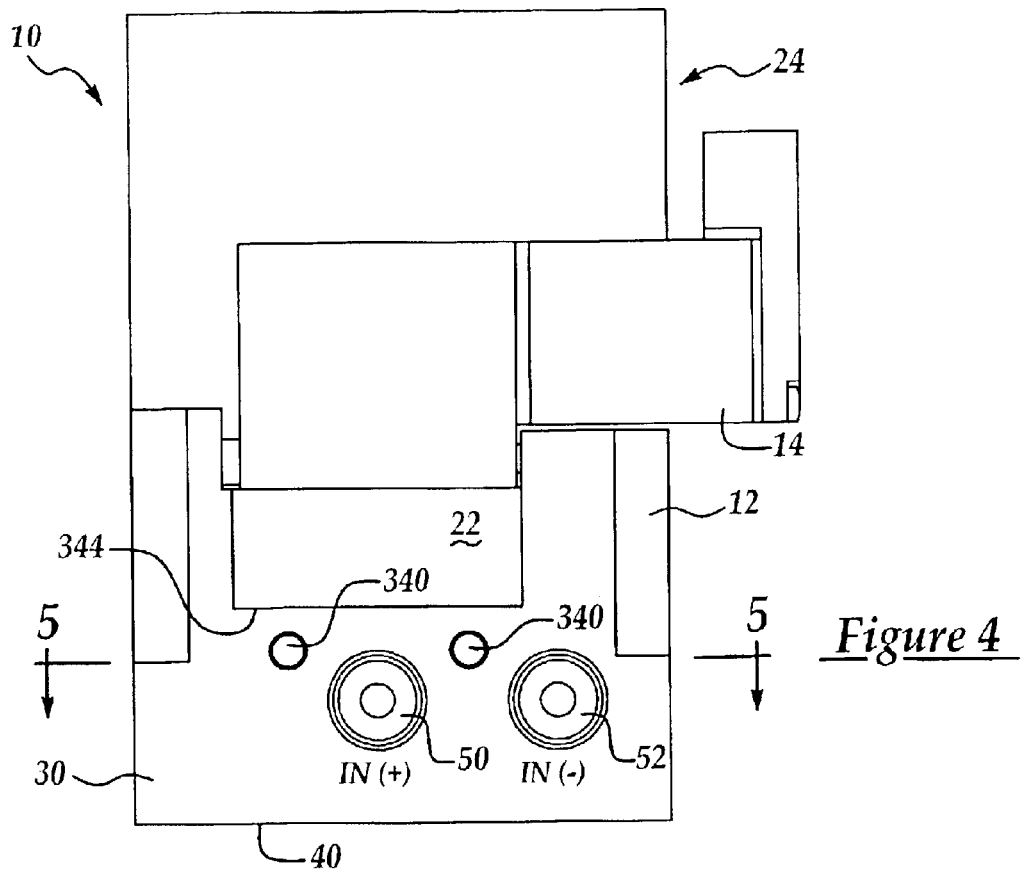
FIG. 4 is still another side view of the proportional pressure regulator assembly of the present invention.

A proportional pressure regulator assembly of the present invention is generally indicated at 10 in FIGS. 1–10, where like numbers are used to designate like components in its various operational modes. The proportional pneumatic pressure regulator assembly 10 of the present invention includes a main body, generally indicated at 12, a fill regulator valve, generally indicated at 14, an exhaust valve, generally indicated at 16, a vacuum regulator valve, generally indicated at 20, a function plate, generally indicated at 22, and a control circuit assembly, generally indicated at 24. The fill regulator valve 14 acts to provide a predetermined positive pressure to a downstream pneumatically actuated device in response to a command signal. On the other hand, the vacuum regulator valve 20 acts to provide a predetermined negative pressure to the downstream pneumatically actuated device in response to a command signal. The exhaust valve 16 acts to provide a vent of pneumatic pressure at predetermined times in response to a command signal. The function plate 22 acts to simplify the overall assembly. The control circuit assembly 24 provides command signals for controlling the operation of each of the valves 14, 16, and 20. Each of the main body 12, fill regulator valve 14, exhaust valve 16, vacuum regulator valve 20, function plate 22, and control circuit assembly 24 will be described in greater detail below.

Referring specifically to FIGS. 1–4, the main body 12 is defined by a two pairs of opposing sidewalls 30, 32 and 34, 36, and a top 38 and bottom 40 face that extend between the two pairs of sidewalls. The main body 12 has a first inlet 50 adapted for fluid communication with a supply of positive pneumatic pressure, a second inlet 52 adapted for fluid communication with a supply of negative pneumatic pressure, at least one outlet 54 adapted for fluid communication with at least one pneumatically actuated device, and an exhaust port 56. The inlets 50, 52 are formed in sidewall 30 of the main body 12, and are internally threaded to accommodate a corresponding threaded connection with tubing or piping that provides the sources of positive and negative pressures as needed by the particular application. The outlet 54 is formed in sidewall 36 and the exhaust port 56 is formed in sidewall 34 and both are threaded in a similar manner to the inlets 50, 52. The main body 12 has a series of internal passages that provide fluid communication from the above-mentioned ports to the valves. These internal passages will be described in greater detail below. It should be appreciated by those having ordinary skill in the art that any variety of connection interfaces or fittings may by used to establish fluid communication between the present invention and the sources of supply pressure. It should also be appreciated that it may be additionally desirable, based on the application, to exhaust the pressures as a direct vent to the immediate ambient atmosphere surrounding the proportional pressure regulator assembly 10 so that it is not necessary to thread the exhaust port 56 for connection to tubing, or a piping circuit, for remote venting.

The fill regulator valve 14 of the proportional pressure regulator 10 is supported on the main body 12 and is in fluid communication with the first inlet port 50 and the outlet 54. The fill regulator valve 14 is adapted to regulate the supply of positive pressure to a predetermined value from the first inlet port 50 through the outlet 54 to a pneumatically actuated device when the fill regulator valve 14 is actuated. The exhaust valve 16 is also supported on the main body 12 and is in fluid communication with the outlet 54 and is operable to exhaust pressure from the outlet 54 through the exhaust port 56 when the exhaust valve 16 is actuated.

The fill regulator valve 14 and the exhaust valve 16 are both structurally four-way valves that are used in the preferred embodiment in a particular manner so that they function as two way valves. It should be appreciated by those having ordinary skill in the art that two and three-way valves may also be used in the present invention without departing from the scope of invention. However, in the particular embodiment disclosed herein the use of a four-way valve in the preferred embodiment allows for a dual outlet path, which provides greater flow capacity.

Figure 7A:
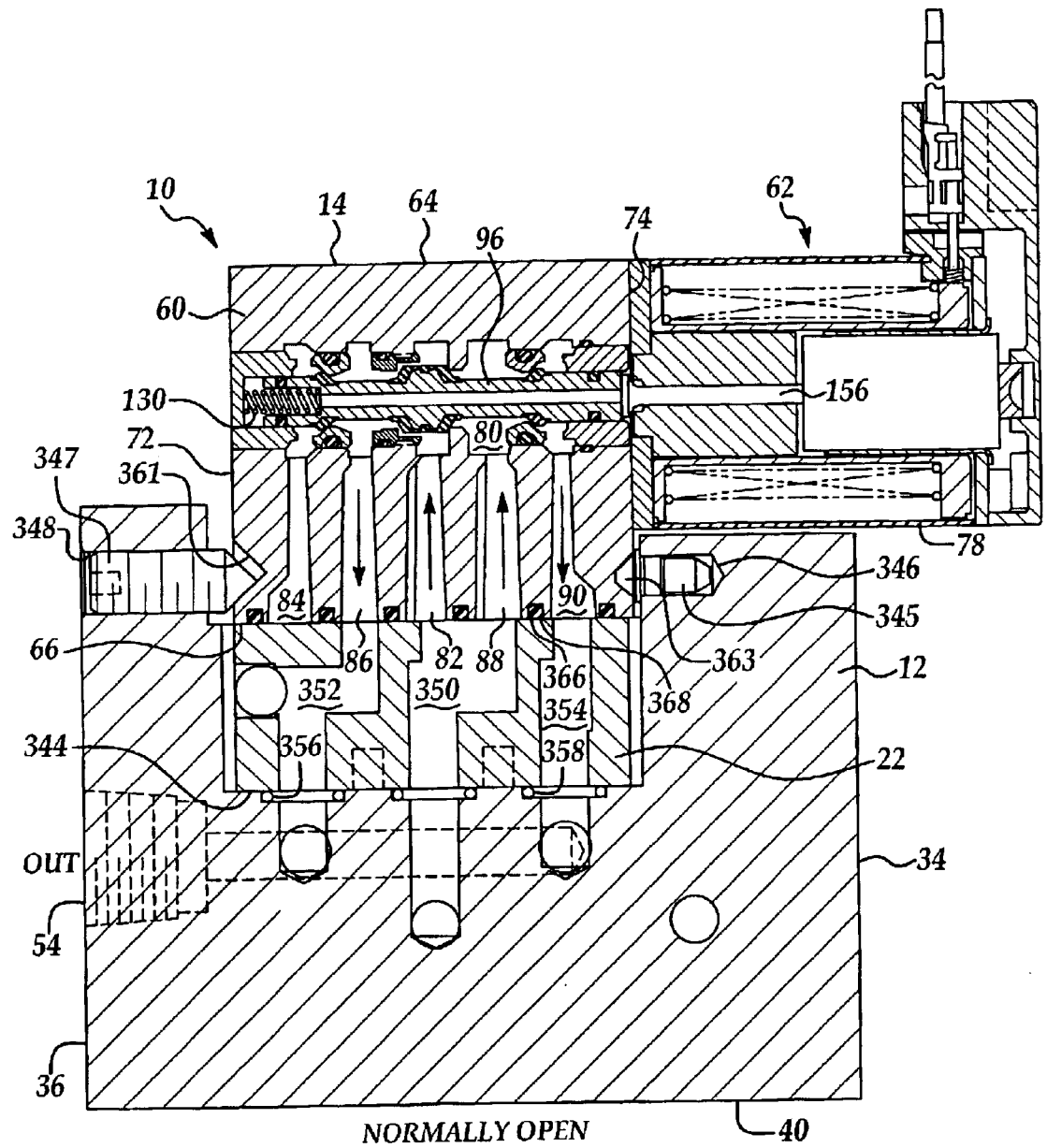
FIG. 7A is cross-sectional side view taken along lines 7A—7A of FIG. 1 showing the fill regulator valve of the proportional pressure regulator assembly of the present invention in the de-energized position and the normally open configuration.
Figure 7B:
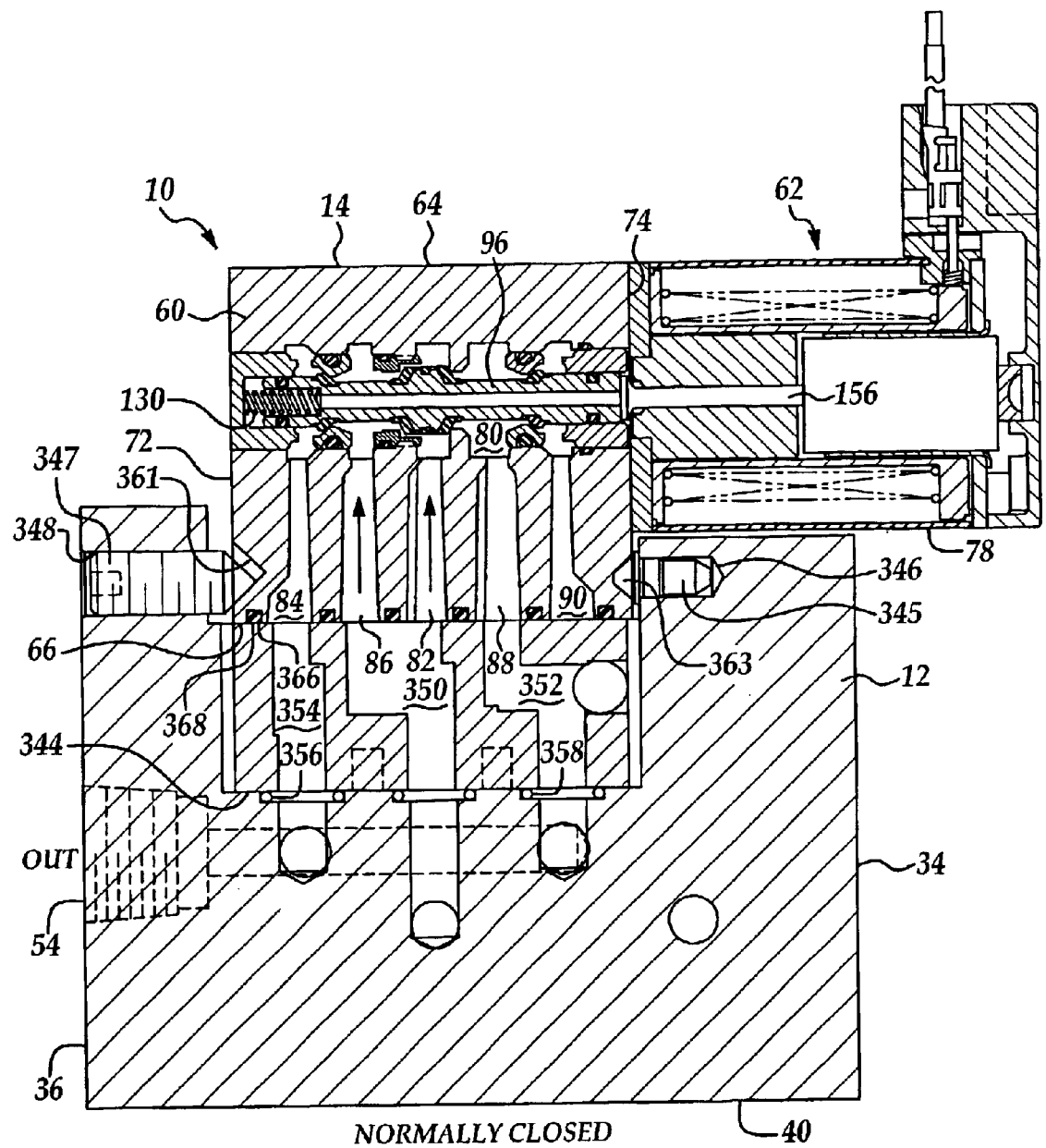
FIG. 7B is cross-sectional side view taken along lines 7B—7B of FIG. 1 showing the fill regulator valve of the proportional pressure regulator assembly of the present invention in the de-energized position and the normally closed configuration.
Figure 7C:
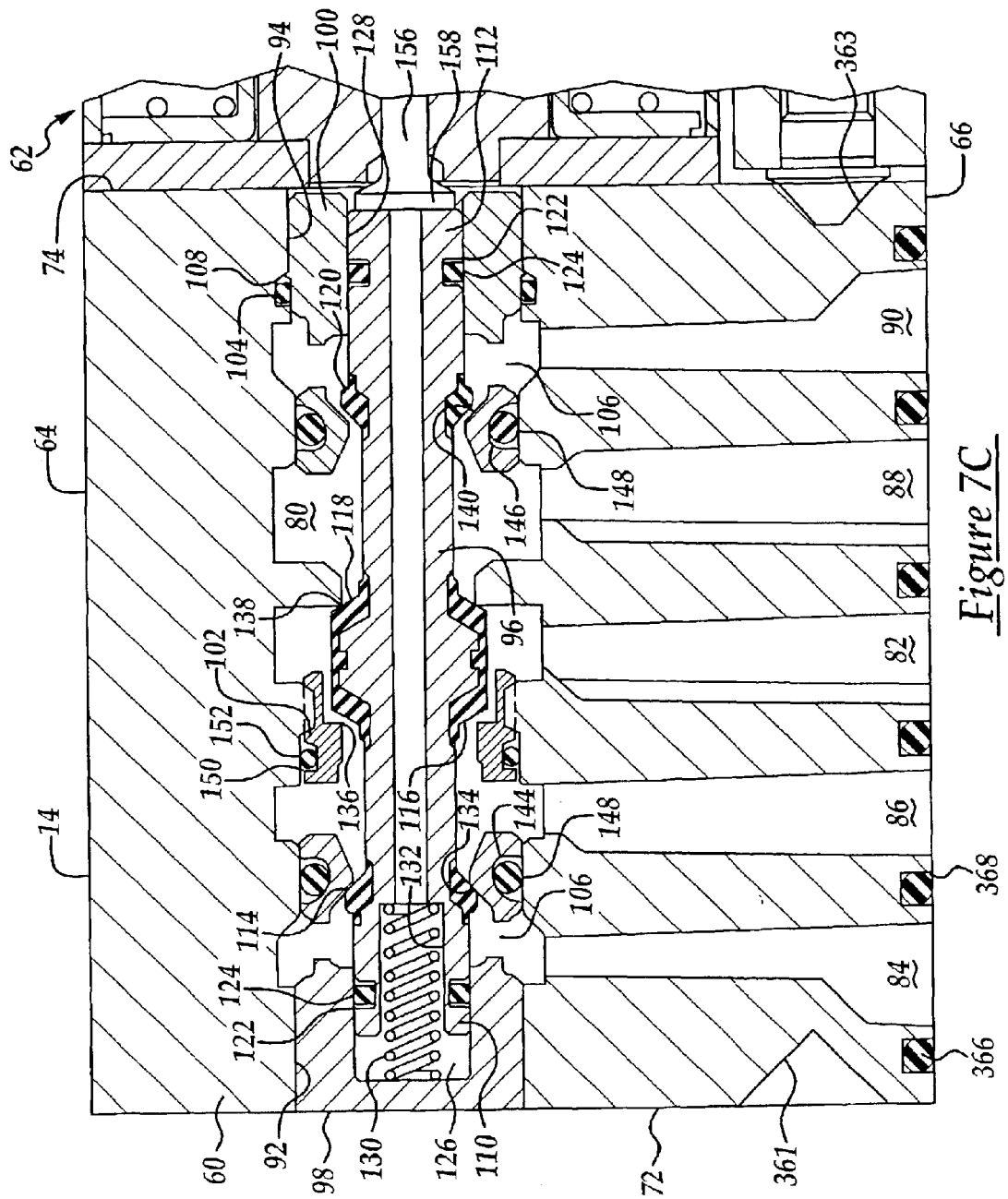
FIG. 7C is detailed cross-sectional side view taken through the fill regulator valve of the proportional pressure regulator assembly of the present invention in the de-energized position.
Figure 7D:
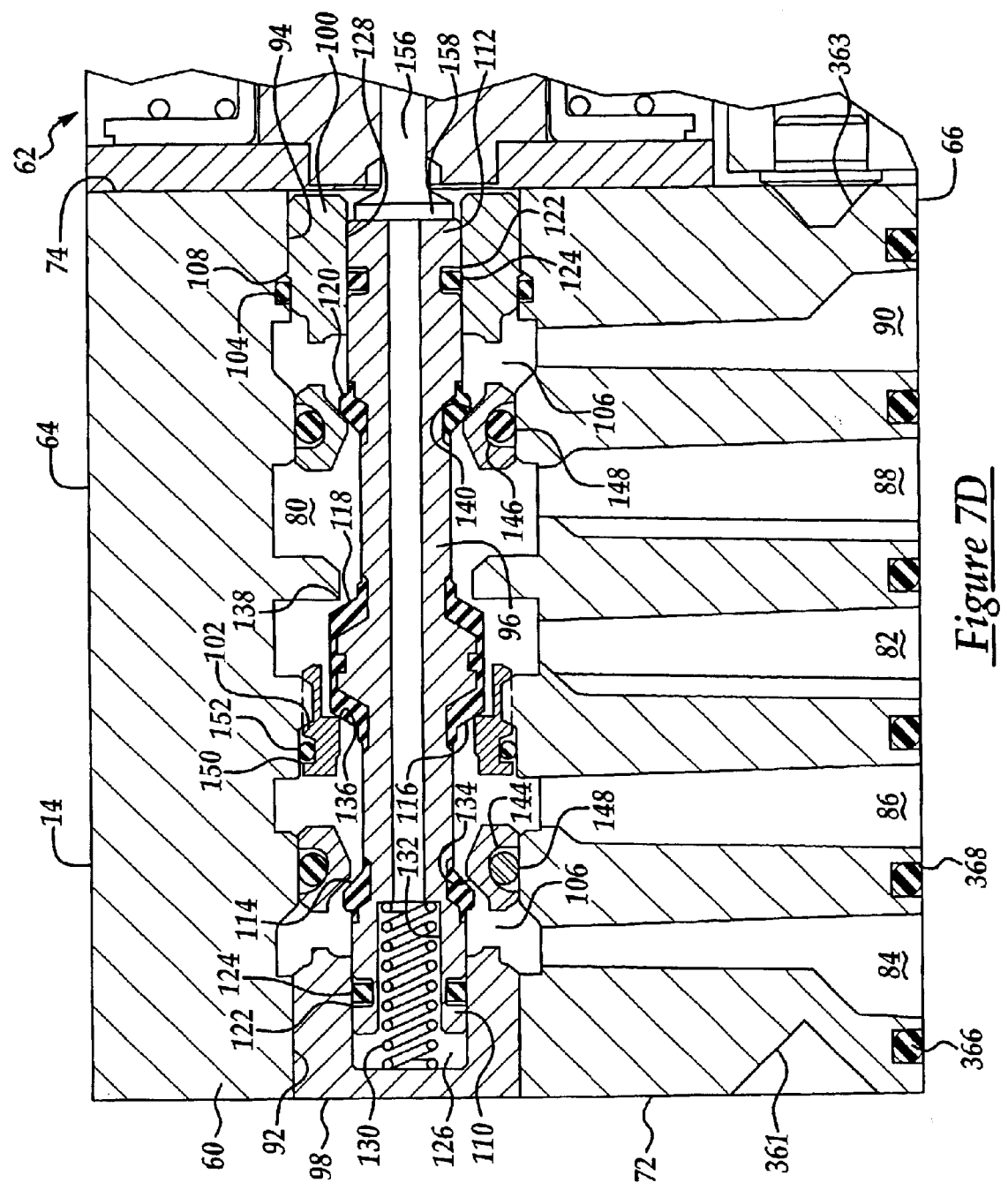
FIG. 7D is cross-sectional side view illustrating the fill regulator valve of the proportional pressure regulator assembly of the present invention in the energized position.
Figure 8A:
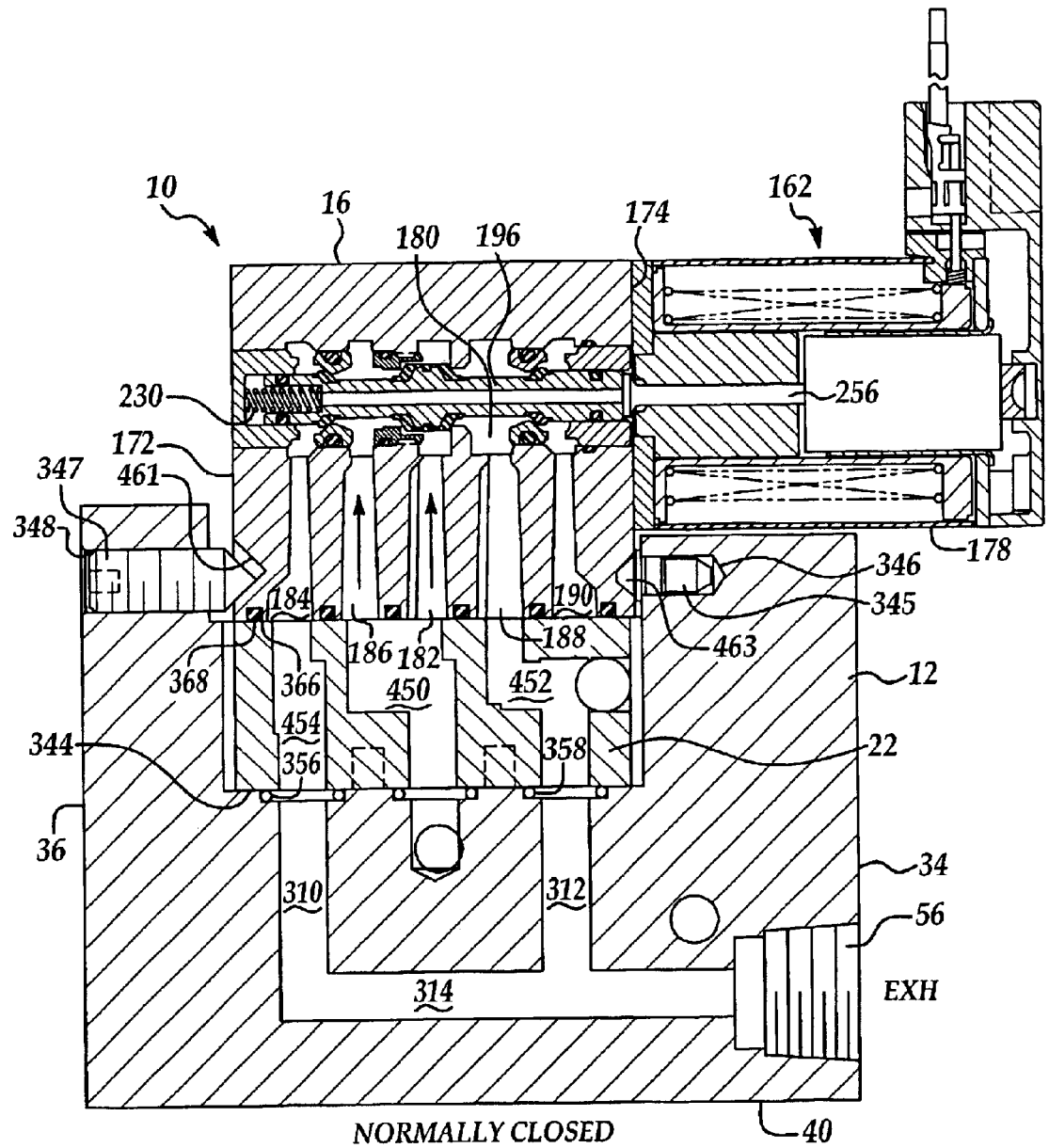
FIG. 8A is cross-sectional side view taken along lines 8A—8A of FIG. 1 showing the exhaust valve of the proportional pressure regulator assembly of the present invention in the de-energized position and the normally closed configuration.
Figure 8B:
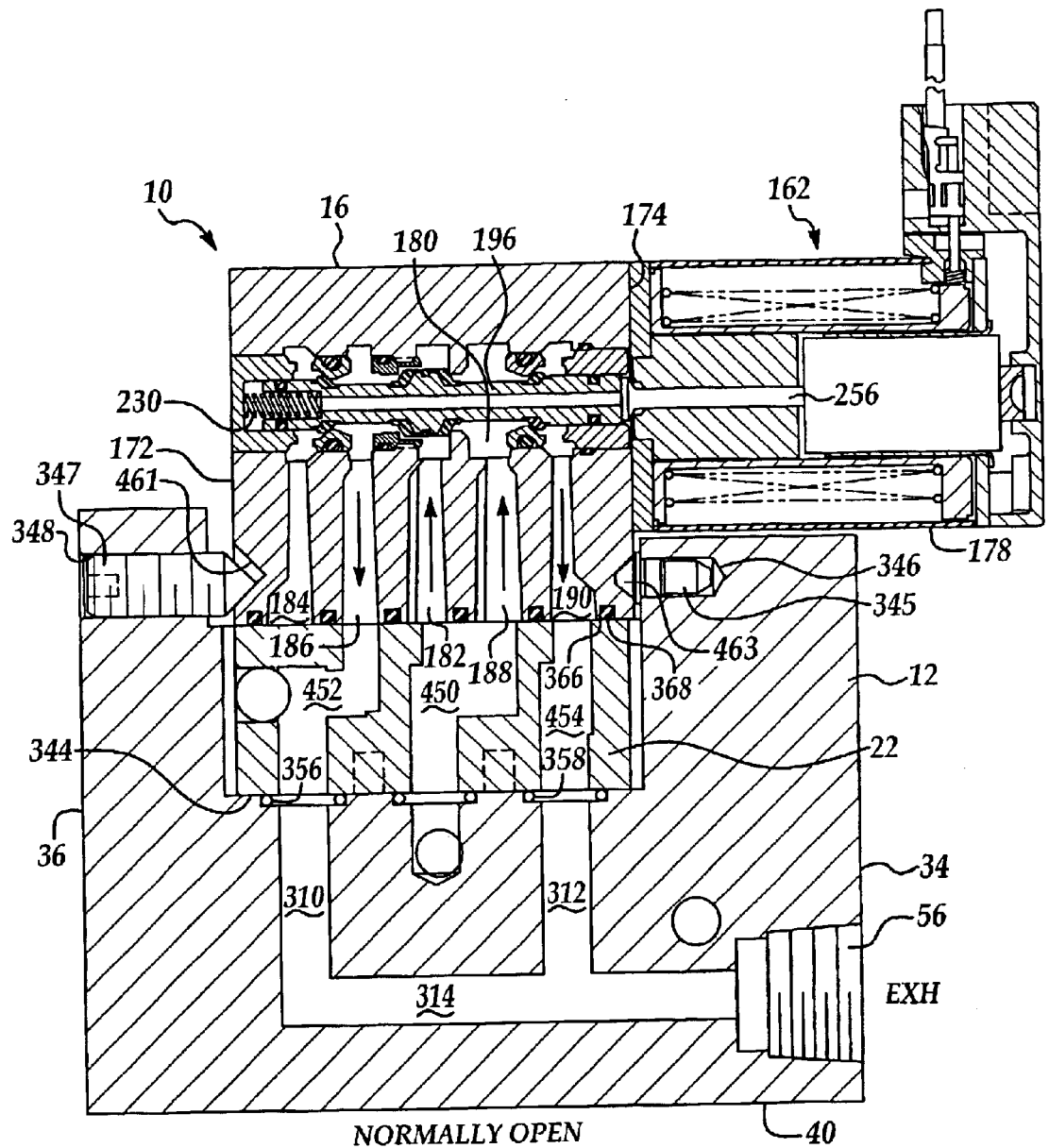
FIG. 8B is cross-sectional side view taken along lines 8B—8B of FIG. 1 showing the exhaust valve of the proportional pressure regulator assembly of the present invention in the de-energized position and the normally open configuration.
Figure 8C:
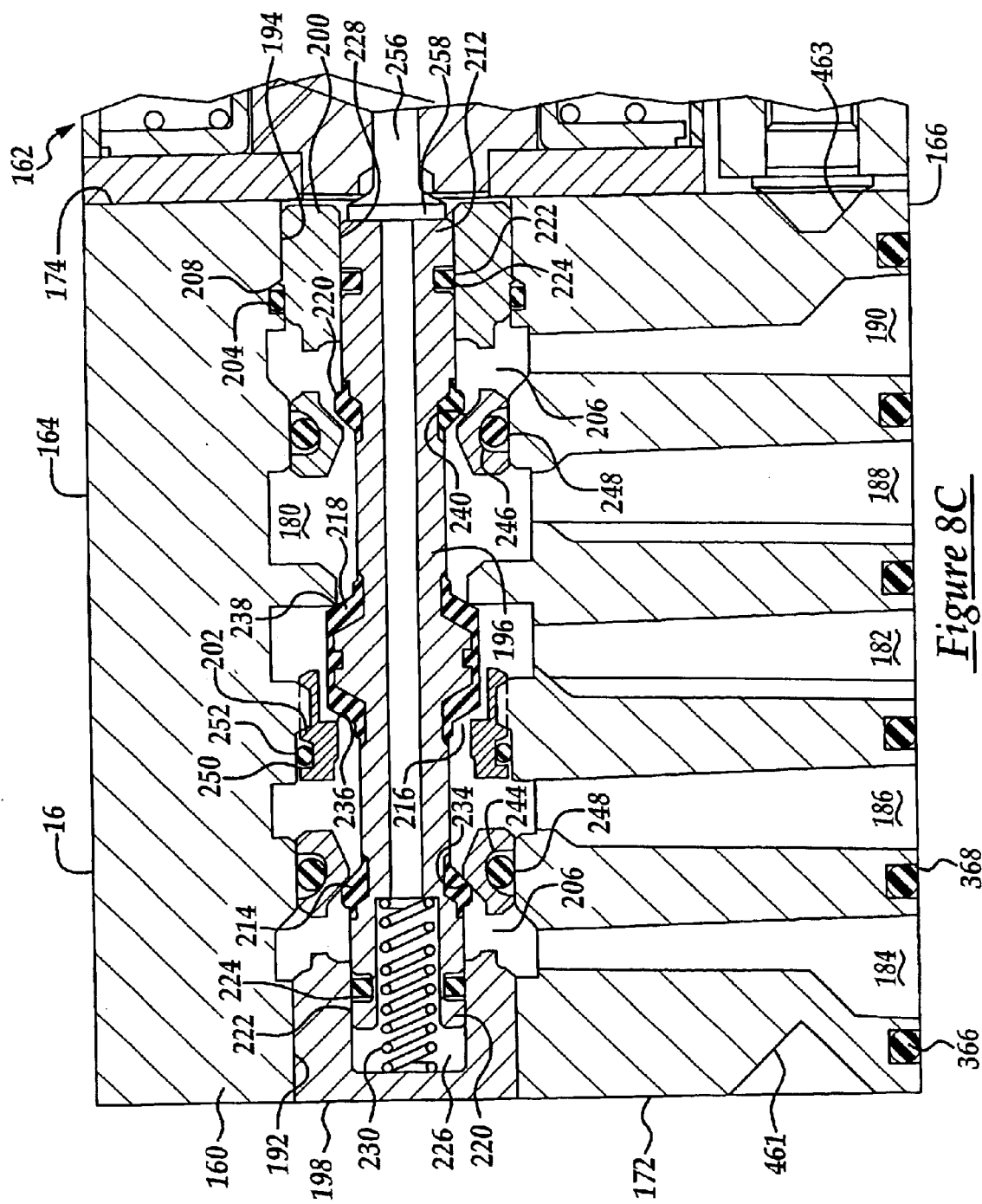
FIG. 8C is detailed cross-sectional side view illustrating the exhaust valve of the proportional pressure regulator assembly of the present invention in the de-energized position.
Figure 8D:
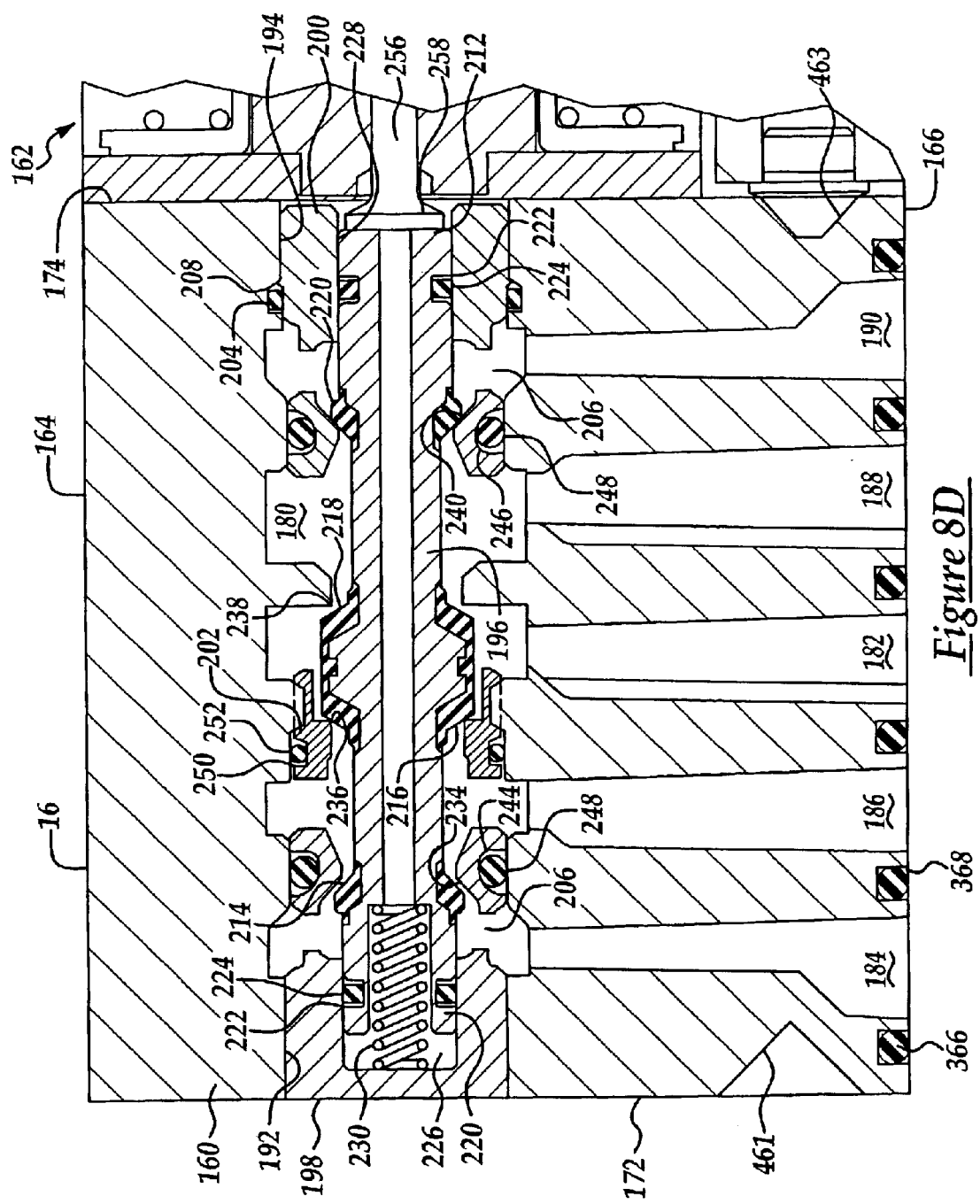
FIG. 8D is detailed cross-sectional side view illustrating the exhaust valve of the proportional pressure regulator assembly of the present invention in the energized position.

The fill regulator valve 14 and the exhaust valve 16 each have substantially the same structure such that the following detailed description of the fill regulator valve 14 as shown in FIGS. 7C and 7D is also applicable to the exhaust valve 16 depicted in FIG. 8C and 8D where like components are indicated with reference numbers incremented by 100. Referring specifically now to FIGS. 7A and 7B, the fill regulator valve 14 includes a valve body 60 and an electromagnetic actuator, generally indicated at 62, mounted to the valve body 60. The valve body 60 has a thin rectangular shape defining top 64 and bottom 66 surfaces, a pair of opposed side surfaces 68, 70 extending between the top 64 and bottom 66 surfaces, and end surfaces 72, 74. The actuator 62 is operable to selectively move the fill regulator valve 14 from a first position to a second position, and further operable to move the fill regulator valve 14 back from the second position to the first position as will be described in greater detail below.

The valve body 60 includes an inlet port 82 for communicating with the source of pressurized air through the first inlet port 50 in the main body 12. A valve bore 80 extends axially through the valve body 60. Since the valve is of a four-way configuration, the valve body 60 includes two cylinder ports 86, 88, each with a corresponding exhaust port 84 and 90, respectively. All of these ports 82, 84, 86, 88, and 90 are in fluid communication with the valve bore 80 and are, in this preferred embodiment, formed through the bottom surface 66 of the valve body 60. However, as will be discussed below, the respective placement of the fill regulator 14 and exhaust 16 valves on the main body 12, and the orientation of the function plate 22, ties one of the cylinder ports to the inlet port and also blocks an exhaust port, thereby causing the valve to act with two-way functionality.

As shown in detail in FIGS. 7C and 7D, the valve bore 80 extends completely through the valve body 60 to present a pair of open ends 92, 94. A valve member, generally indicated at 96, is movable between predetermined positions within the valve bore 80 to selectively direct pressurized air from the inlet port 82 through the cylinder ports 86, 88 and the exhaust ports 84, 90 as will be described in greater detail below. A pair of end retainer inserts 98 and 100 are received in the pair of open ends 92, 94, respectively, of the valve body 60 and act to retain the valve member 96 within the valve bore 80 as will be described in greater detail below. Similarly, the valve assembly may include one or more inner retainers that are threadably positioned within the valve bore 80. In the embodiment illustrated herein, the valve assembly 14 includes inner retainer 102 that is threadably positioned within the valve bore 80.

The valve member 96 further includes a pair of opposed valve heads 110, 112 disposed at either end of the valve member 96 and at least one valve element formed on the valve member 96 between the valve heads 110, 112. A plurality of valve elements 114, 116, 118, and 120 are formed on the valve member 96 and each are operable to selectively direct a flow of pressurized air from the inlet port 82 through the valve bore 80 to the respective cylinder, or outlet, ports 86, 88. The valve member 96 further includes annular grooves 122 that receive o-ring type seals 124, which slidingly engage the central bore openings 126, 128 respectively, of the end retainers 98 and 100 to prevent leakage of the pressurized air within the valve bore 80. The end retainers 98, 100 are also sealed to the valve body 60 by an o-ring type seal 104 fit within an annular groove 108 cut about the end bore 94. In the preferred embodiment, the valve member 96 is an aluminum insert that is over-molded with a suitable resilient material such as rubber, or any known elastomer, in the appropriate places. More specifically, it should be appreciated by those having ordinary skill in the art that the material of the sealing surface may be made of any known composition that is slightly yielding, yet highly resilient, such as nitrile, which may be bonded, or over-molded to the valve element 96.

The end retainer inserts 98 and 100 each include a plurality of cylinder passages 106 defined in the diameter of the retainers that are spaced radially relative to one another. The cylinder passages 106 provide fluid communication between the valve bore 96 and the respective adjacent ports. A biasing member 130, such as a coiled spring, is positioned between the cup-shaped end retainer insert 98 and a recess 132 formed in valve head 110 of the valve member 96. The biasing member 130 applies a constant biasing force against the valve member 96 and to the right as viewed in FIG. 7C.

A plurality of valve seats 134, 136, 138, and 140 are presented in the valve bore 96. The valve seats 134, 136, 138, and 140 cooperate with the valve elements 114, 116, 118, and 120, respectively, to seal the various passages in the valve body 80 as will be discussed in greater detail below. The valve seats 134, 136, 138, and 140 provide a sealing contact with the valve sealing surfaces of the valve elements 114, 116, 118, and 120 when the valve member 96 is in a closed position, relative to a particular outlet port, thereby interrupting the flow of pressurized air to that port.

Of the plurality of valve seats 134, 136, 138, and 140 shown in FIGS. 7C and 7D, some may be formed directly in the valve bore 96 itself, as in the case of valve seat 138, while others (e.g., valve seats 134, 136, and 140) may be disposed upon the end retainer inserts 98, 100 and inner retainer insert 102. The retainer inserts 98, 100, and 102 maybe adjustably positioned within the valve bore 96 of the valve body 60, having a threadable interaction with the ends 92, 94 or any other suitable portion of the valve bore 96. As discussed above, each of the end retainer inserts 98, 100 has a central bore 126, 128 that receives the opposed heads 110, 112 of the valve member 96 and allows it to slidingly move within the valve body 60. Thus, the threadably set position of the end retainer inserts 98, 100 within the valve body 60 controls the sealing of the valve seats with a given linear force applied to the valve member 96. The end retainer inserts 98, 100 further include annular grooves 144 and 146 which receive o-ring type seals 148 to prevent leakage of the pressurized air within the valve bore 80. On the other hand, the positions to which the inner retainer insert 102 is threadably set defines the predetermined "open" and "closed" positions of the valve assembly 14 and thereby sets the stroke length of the valve member 96. And like the end retainer inserts, the inner retainer 102 may also include an annular groove 150 which is adapted to receive an o-ring type seal 152 so as to prevent leakage of the pressurized air within the valve bore 80.

In the preferred embodiment, the central bore 128 of end retainer insert 100, which receives the valve head 112 of the valve member 96, also extends fully through the retainer allowing the actuator assembly 62 to engage and thereby actuate the valve member 96. As shown for illustration purposes only, this maybe accomplished by the use of an actuator pushpin 156 having an enlarged head 158 that extends into the retainer insert 100 to engage and actuate the valve member 96. It should be appreciated by those of ordinary skill in the art that the specific actuating means used to provide motive force to the valve member 96 lies beyond the scope of the present invention. Accordingly, it should be further appreciated that any number of different types of actuating elements, rather than a pushpin, may be employed based on the actuating means used. A solenoid assembly, generally indicated at 78, is used to selectively actuate the valve member 96 within the valve bore 80 in the direction opposite to the biasing force of the biasing member 130. In this manner, the solenoid assembly 78 drives the valve member to the left, as shown in FIG. 7D, and the biasing member 130 returns the valve member 96 to its original position (to the right, in FIG. 7C) when the solenoid 78 is deactivated. The solenoid assembly 78 may be of any suitable type, for example as described in greater detail in U.S. Pat. No. 6,192,937. Alternatively, the actuator may be an electromagnetic solenoid having a floating armature with lost-motion biasing such as described in prior art U.S. Patent Nos. 4,438,418 or 3,538,954. Each of these patents are assigned to the assignee of the present invention and the disclosures of these patents are incorporated herein by reference.

As previously mentioned, the structure of the exhaust valve 16 is substantially similar to the fill regulator valve 14 and includes the same components as the above-described fill regulator valve 14, so that the same reference numbers incremented by 100 are used in FIGS. 8A–8D to depict the exhaust valve 16. As also previously mentioned, the four-way construction of the fill regulator valve 14 (and exhaust valve 16) is operatively converted into a two-way function by the orientation of the function plate 22. The orientation of the function plate 22 also determines whether the valve is in a normally open or a normally closed condition.

Figure 5:
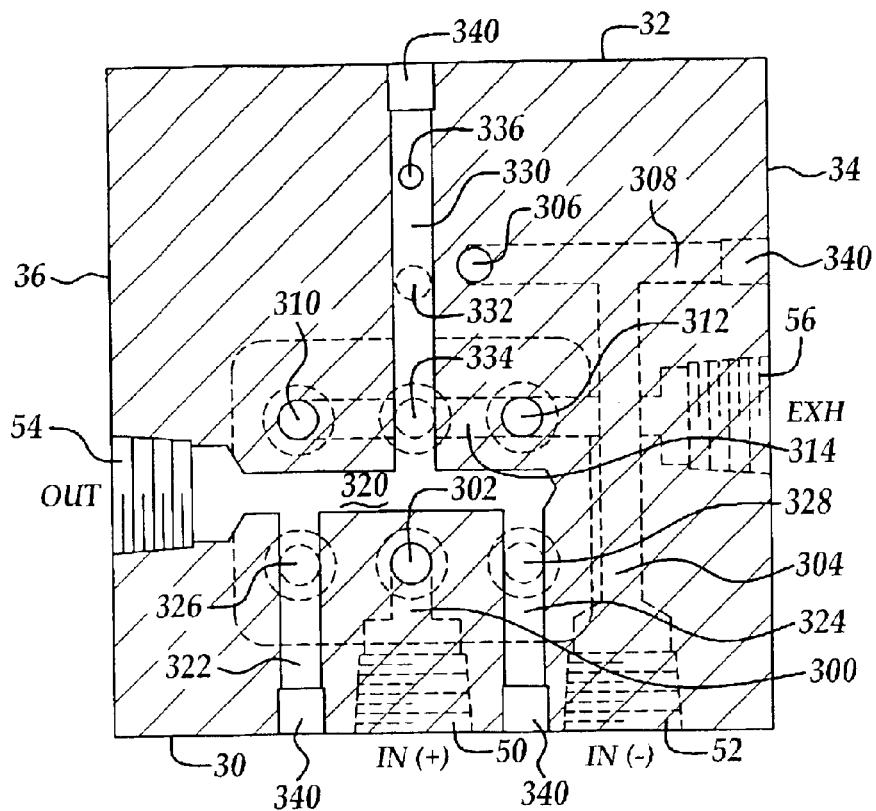
FIG. 5 is a top down cross-sectional view of the main body of the proportional pressure regulator assembly of the present invention taken substantially along lines 5—5 of FIG. 2 or 4 showing internal flow passages.
Figure 6:
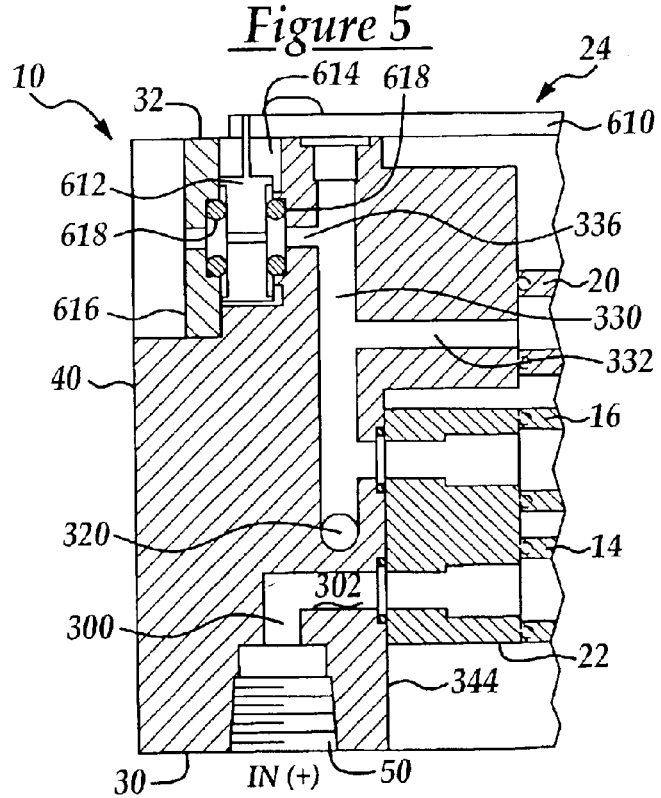
FIG. 6 is a side cross-sectional view of the main body of the proportional pressure regulator assembly of the present invention showing internal flow passages.

To route the flow of pressures from the inlets 50, 52 and exhaust 56 to the outlet 54, the main body 12 further includes a series of internal passages. FIGS. 5, 6 and 7A through 9C show the various flow passages through the main body 12. As previously mentioned, the main body includes a top 38 and a bottom face 40 and for purposes of this discussion while referring to FIG. 5, those surfaces will be considered to he set in the horizontal plane. Thus, as shown in FIGS. 5 and 6, the first inlet passages of the main body 12 include a first horizontal inlet passage 300 and a first vertical inlet passage 302. The first inlet passage 300 provides fluid communication between the first inlet port 50 and the first vertical inlet passage 302. The first vertical inlet passage 302 is cooperatively connected to the fill regulator valve 14, so that the source of incoming positive pressure at the inlet 50 is communicated to the fill regulator valve 14.

The second inlet passages of the main body 12 include a second horizontal inlet passage 304, a second vertical inlet passage 306, and a horizontal intermediate inlet passage 308. The second horizontal inlet passage 304 is in fluid communication with the second inlet port 52 and the horizontal intermediate inlet passage 308. The horizontal intermediate inlet passage 308 connects to the second vertical inlet passage 306, which is further cooperatively connected to the vacuum regulator valve 20, so that the source of incoming pressurized air at the second inlet 52 is communicated to the vacuum regulator valve 20.

The exhaust passages of the main body 12 include a pair of vertical exhaust passages 310, 312 and a main exhaust passage 314. The main exhaust passage 314 providing fluid communication between the exhaust port 56 and the exhaust valve 16 through the pair of vertical exhaust passages 310, 312, so that the source of atmospheric, or vent pressure at the exhaust port 56 is communicated to the exhaust valve 16.

The outlet passages within the main body 12 include a main charge passage 320, a pair of first horizontal charge passages 322 and 324, a pair of first vertical charge passages 326 and 328, a second horizontal charge passage 330, a second vertical charge passage 332, a vertical discharge passage 334, and a feedback passage 336. The outlet port 54 is directly connected to, and in fluid communication with, the main charge passage 320 so that the state of the main charge passage 320, albeit positive pressure, negative pressure, or exhaust (atmospheric) pressure, is communicated to any downstream device connected to the outlet 54. The outlet passages are interconnected and in fluid communication with the main charge passage 320, as follows. The pair of first vertical charge passages 326, 328 are in fluid communication with the outlets of the fill regulator valve 14 and individually and respectively connect to the pair of first horizontal charge passages 322, 324. The pair of first horizontal charge passages 322, 324 are also connected to the main charge passage 320, so that a source of pressurized air is provided to the outlet 54 from the fill regulator valve 14 when the fill regulator valve 14 is actuated.

The second vertical charge passage 332 is in fluid communication with the outlet of the vacuum regulator valve 20 and the second horizontal charge passage 330, which is also connected to the main charge passage 320, so that a source of negative pressurized air is provided to the outlet 54 from the vacuum regulator valve 20 when the vacuum regulator valve 20 is actuated.

The vertical exhaust passage 334 is in fluid communication with the outlets of the exhaust valve 16 and the second horizontal charge passage 330, which is also connected to the main charge passage 320, so that an exhaust path, or source of atmospheric vent pressure is provided to the outlet 54 from the exhaust valve 16. In this manner the main charge passage 320 and thus the outlet 54 is discharged, or vented, when the exhaust valve 16 is actuated.

The feedback passage 336 provides fluid communication between the second horizontal charge passage 330 and a pressure transducer of the control circuit assembly 24 to provide a feedback pressure signal, as will be discussed in greater detail below. Thus, the main charge passage 320, and thereby the outlet 54 is provided with positive pressure, negative pressure, or exhaust, depending on the operation of the proportional pressure regulator assembly 10.

As illustrated in the Figures, and as should be appreciated by those having ordinary skill in the art, some of the passages within the main body 12 extend to the outer surfaces of the main body 12 and are closed by a plurality of plugs 340. This is merely representative of the necessary drillings performed upon the solid form of the main body 12 to create the internal passages described above. It should be further appreciated that the through drillings and plugs 340 as shown are non-limiting, as other manufacturing techniques may be possible that would to eliminate these features, but which would not depart from the spirit and scope of the present invention.

The function plate 22 is located generally between the body 12 and an associated regulator valve 14, 16. The function plate 22 includes a series of internal passages 350, 352, and 354. The function plate 22 is asymmetric about an axis such that it may be inserted between a valve and any variety of mounting surfaces also having fluid passages so that the orientation of the function plate determines if the valve operates in a normally open or normally closed configuration. The use of a function plate 22 simplifies assembly and eliminates the need for more than one valve type or configuration. In the present invention, function plate 22 is duplexed, or doubled, allowing two valves to be disposed upon it a one time and operatively setting the normal state of each valve. Specifically, as can be seen in FIGS. 4, 6, 7A, 7B, 8A, and 8B the function plate 22 is disposed within a recess 344 of the top face 38 of the main body 12. The function plate 22 provides two sets of lateral, left to right, passages (as viewed in the FIGS. 5, 7A, 7B, 8A, and 8B) interconnecting the fill regulator valve 14 and the exhaust valve 16 to the main body 12 as will be described in greater detail below.

More specifically, as best shown in the cross-sectional view of the fill regulator valve 14 in FIG. 7A, there are a first series of drilled and milled out openings that combine to form three internal passages 350, 352, and 354 within the function plate 22 that affect the fill regulator valve 14 disposed immediately above the passages. Likewise, as best shown in the cross-sectional view of the exhaust valve 16 in FIG. 8A, there are a second series of drilled and milled out openings that combine to form another group of three similar, but reversed, internal passages 450, 452, 454 within the function plate 22 that affect the exhaust valve 16 disposed immediately above. Specifically in FIG. 7A, the central passage in the function plate 22 is the inlet passage 350, which opens the inlet port 82 and the cylinder port 88 of the fill regulator valve 14 to the incoming pressurized air from the inlet 50 through the internal passages of the main body 12 as previously described. The left passage 352 and right passage 354 in the function plate 22 provide dual output passages from the fill regulator valve 14 to the outlet passages of the main body 12 as previously described. Still referring to FIG. 7A, the function plate 22 is oriented to cause the fill regulator valve 14 to be in a normally open state. Specifically, the internal passages of the function block 22 first provide for direct fluid communication between the inlet port 82 and cylinder port 88. Cylinder port 86 and exhaust port 90 are connected to the outlet 54 and exhaust port 84 is blocked off. Thus, with the actuator 62 de-energized and the biasing member 130 influencing the valve member 96 to the right, the valve elements 114 and 118 are sealingly seated against valve seats 134 and 138. Therefore, incoming positive pressure is delivered through the inlet 50 and fed through the inlet port 82 past open valve seat 136 and into cylinder port 86 and out the outlet 54. Concurrently, the incoming positive pressure is also fed up through cylinder port 88 past open valve seat 140 and out exhaust port 90 to the outlet 54.

When the actuator 62 is energized, as shown in detail in FIG. 7D, the pushpin 156 drives the valve member 96 to the left, the valve elements 114 and 118 lift from their valve seats 134 and 138 and valve elements 116 and 120 are sealingly seated against valve seats 136 and 140. Therefore, the incoming positive pressure from inlet 50 that is fed through the inlet port 82 is stopped at the closed valve seat 136 and concurrently, the incoming positive pressure that is fed up through cylinder port 88 is stopped at the closed valve seat 140. While valve seat 138 is open at this time, it is merely between the two pressurized ports 82 and 88 and has no effect on the output of the valve 14.

The fill regulator valve 14 is illustrated in a normally closed state in FIG. 7B. This is accomplished by reorienting the function plate 22 (rotating the plate 180 degrees in the horizontal plane) within the main body 12 so that the internal passages from left to right (as illustrated) are reversed. In other words, there is a now a direct fluid communication between the inlet port 82 and cylinder port 86. Exhaust port 84 and cylinder port 88 are connected to the outlet 54 and exhaust port 90 is blocked off. With the actuator 62 de-energized and the biasing member 130 influencing the valve member 96 to the right, the valve elements 114 and 118 are sealingly seated against valve seats 134 and 138. However, as the incoming positive pressure is now delivered through the inlet 50 and fed through the inlet port 82, it is stopped at the closed valve seat 138 and concurrently, the incoming positive pressure that is also fed up through cylinder port 86 is stopped at closed valve seat 134. While valve seat 136 is open at this time, it is merely between the two pressurized ports 82 and 86 and has no effect to the output.

When the actuator 62 is energized and the pushpin 156 drives the valve member 96 to the left, the valve elements 114 and 118 lift from their valve seats 134 and 138 and valve elements 116 and 120 are sealingly seated against valve seats 136 and 140. Therefore, incoming positive pressure that is delivered through the inlet 50 and fed through the inlet port 82 will flow past open valve seat 138 and into cylinder port 88 and out the outlet 54. Concurrently, the incoming positive pressure that is also fed up through cylinder port 86 will flow past open valve seat 134 and out exhaust port 84 to the outlet 54. It should be appreciated by those of ordinary skill in the art that the decision to have the fill regulator valve 14 operative as either normally open or normally closed is driven by the requirements of the application and is not a limitation of the present invention.

As previously mentioned, the exhaust valve 16, as shown in FIGS. 8A, 8B, 8C, and 8D is also supported on the main body 12 and is in fluid communication with the outlet 54 and the exhaust port 56 and is operable to exhaust pressure from the outlet 54 through the exhaust port 56 when the exhaust valve 16 is actuated. The structure of the exhaust valve 16, as shown in detail in FIGS. 8C and 8D, is substantially similar to the fill regulator valve 14, and as depicted in the illustrations, includes the same components as the above-described fill regulator valve 14, so indicated by using the same reference numbers incremented by 100. Thus, the exhaust valve 16 functions in the same manner as the fill regulator valve 14 such that the exhaust valve 16 also includes an actuator 162 having a solenoid 178 and a return spring 230. The actuator 162 is operable to selectively move the exhaust valve 16 from a first position to a second position in response to the solenoid 178 being energized by the control circuit assembly 24, and is further operable to move the exhaust valve 16 back from the second position to the first position by action of the return spring 230 in response to the solenoid 178 being de-energized.

As mentioned above, the function plate 22 has a second series of internal passages that operatively affect the exhaust valve 16. Specifically, referring to FIG. 8A, the central passage in the function plate 22 is the inlet passage 450, which opens the inlet port 182 and the cylinder port 136 of the exhaust valve 16 to the incoming pressurized air from the inlet 50 through the internal passages of the main body 12 as previously described. The left passage 452 and right passage 454 in the function plate 22 provide dual output passages from the exhaust valve 16 to the outlet passages of the main body 12 as previously described. Therefore, as shown in FIG. 8A, the function plate 22 is oriented to cause the exhaust valve 16 to be in a normally closed state. It should be appreciated that, in the preferred embodiment, when the function plate 22 is oriented so that the fill regulator 14 is normally open as in FIG. 7A, the second series of internal passages within the function plate 22 that provide fluid communication from the exhaust valve 16 with the main body 12 are constructed as to configure the exhaust valve 16 to be normally closed, as in FIG. 8A. Correspondingly, when the function plate 22 is oriented to provide a normally closed configuration for the fill regulator valve 14 (FIG. 7B) then the exhaust valve side of the function plate 22 is configured to be normally open (FIG. 8B). Finally, a seal between the main body 12 and the function plate 22 is achieved by elastomeric seals, shown at 356 disposed in grooves 358 formed in the main body 12 about the openings of the internal passages to the function plate 22. The seal is further maintained from the function plate 22 to the fill regulator valve 14 and the exhaust valve 16 by another series of elastomeric seals, seen at 366 disposed in grooves 368 disposed in the bottom surfaces 66 and 166 of the valve bodies 60 and 160 respectively.

The fill regulator valve 14 and the exhaust valve 16 are mounted to the main body 12 in such a manner as to sealingly press the bottom surfaces 66 and 166 of the valves 14, 16 downward against the function plate 22 as it is disposed in the recess 342 of the main body 12. Thus, the sealing members 356 between the function plate 22 and the main body 12 and the sealing members 366 between the valve bodies and the function plate 22 seal the flow passages. This is accomplished in the preferred embodiment by locating pins 345 that are set in locating bores 346 in the main body 12 and locating attachment screws 347 that are threadably inserted in attachment bores 348. These interact with the locating points 361, 363, and 461, 463 respectively, which are conical depressions in the end surfaces 72, 74 and 172, 174 of the valves 14, 16. The locating points 361, 363, and 461, 463 are offset slightly away from the bottom surfaces 66 and 166 of the valves 14, 16 and up from the locating bores 346 and attachment bores 348. In this manner, as the locating attachment screws 347 are threaded into the attachment bores 348, the offset of the locating pins 344 and the attachment screws drives the valve body 60 slightly downward to seal the flow passages. It should be appreciated that, although the embodiment of the present invention described herein employs a single function plate 22 that services two valves, it may also be configured as two separate function plates. In this case, each of the separate function plates provide the same above-mentioned operational features but allow separate configuration of the valve flow paths.

Figure 9A:
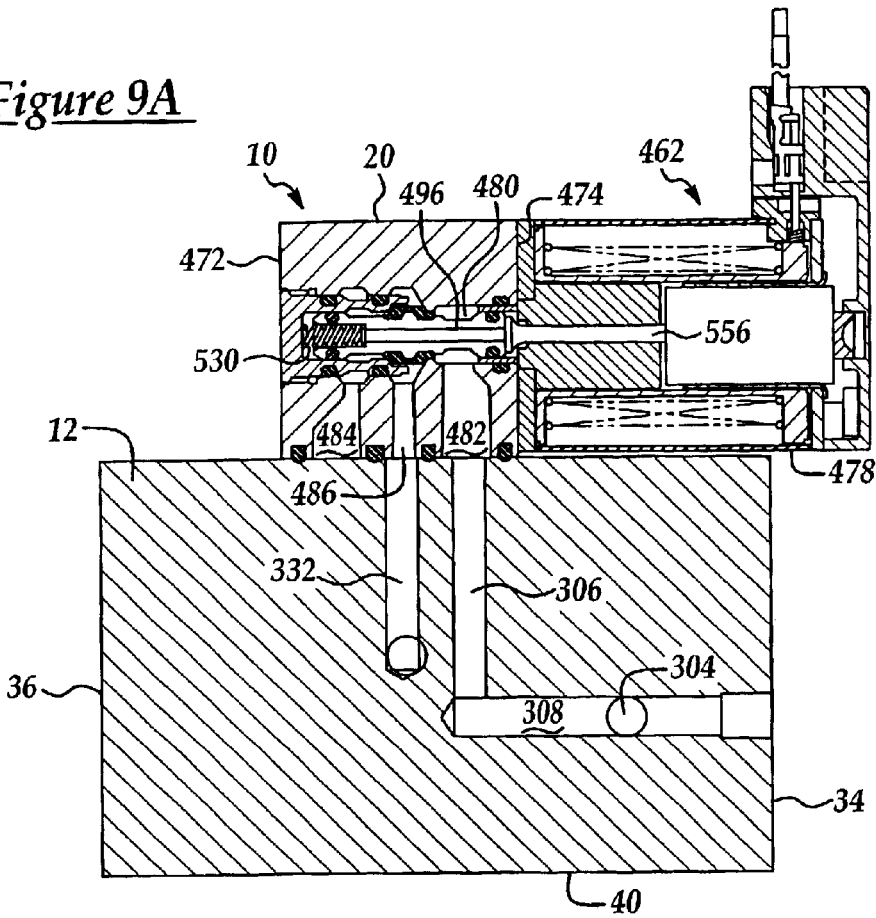
FIG. 9A is cross-sectional side view taken along lines 9A—9A of FIG. 1 showing the vacuum regulator valve of the proportional pressure regulator assembly of the present invention in the de-energized position.
Figure 9B:
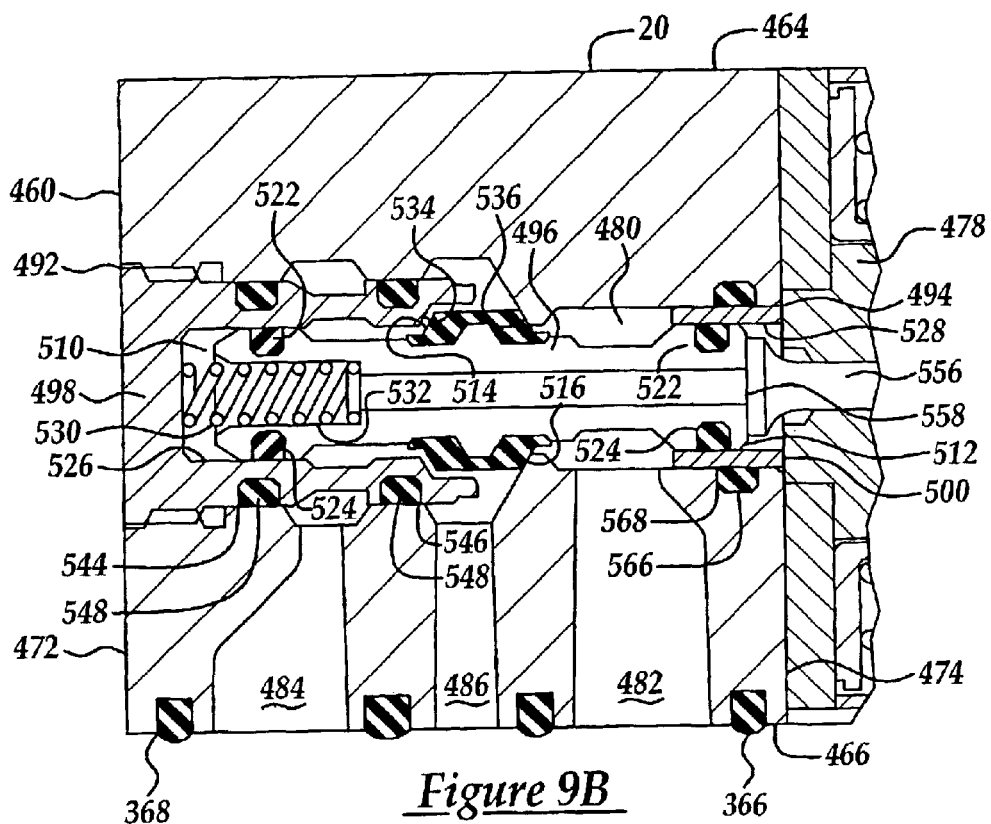
FIG. 9B is a detailed cross-sectional side view illustrating the vacuum regulator valve of the proportional pressure regulator assembly of the present invention in the de-energized position.
Figure 9C:
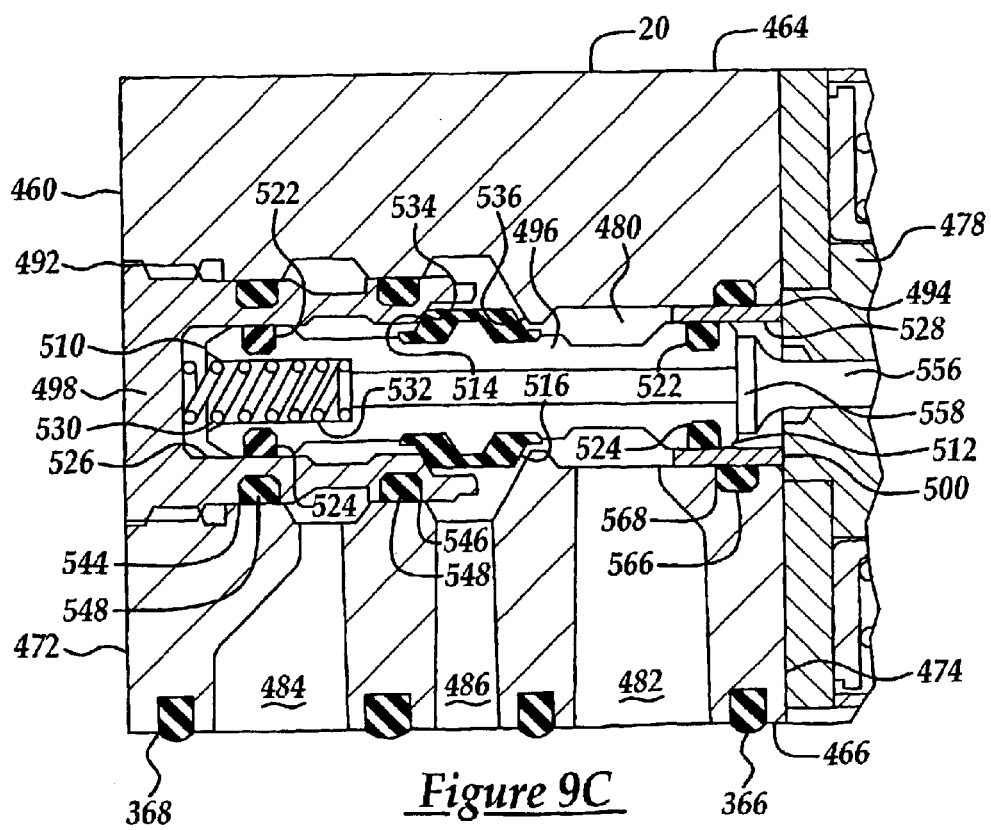
FIG. 9C is a detailed cross-sectional side view illustrating the vacuum regulator valve of the proportional pressure regulator assembly of the present invention in the energized position.

As best shown in FIG. 9, the vacuum regulator valve 20 is also supported on the main body 12 and is in fluid communication with the second inlet port 52 and the outlet 54. The vacuum regulator valve 20 is adapted to regulate the supply of negative pressure to a predetermined value from the second inlet 52 through the outlet 54 to a pneumatically actuated device when the vacuum regulator valve 20 is actuated. The vacuum regulator valve 20 may be mounted directly upon the top surface 38 of the main body 12 and without the need for a function plate as previously discussed. In the preferred embodiment, the vacuum regulator valve 20 is a three-way valve in which one of its output paths is utilized and the other is blocked. As shown in FIGS. 9B and 9C, the vacuum regulator valve 20 includes a valve body 460 having a thin rectangular shape defining top 464 and bottom 466 surfaces, a pair of opposed side surfaces 468, 470 extending between the top and bottom surfaces 464 and 466, and end surfaces 472, 474. The actuator 462 has a solenoid assembly, generally indicated at 478, and a return spring 530 operable to selectively move the vacuum regulator valve 20 from a first position to a second position in response to the solenoid 478 being energized by the control circuit assembly 24, and further operable to move the vacuum regulator valve 20 back from the second position to the first position by action of the return spring 530 in response to the solenoid 478 being de-energized.

The valve body 460 includes an inlet port 482 for communicating with the source of pressurized air through the second inlet port 52 in the main body 12, and an outlet, or cylinder port, 486 for passing the pressurized air to the outlet 54 in the main body 12, and a blocked off outlet port 484. A valve bore 480 extends axially within the valve body 460. The inlet port 482 and outlet ports 484 and 486 are in fluid communication with the valve bore 480 and are formed through the bottom surface 466 of the valve body 460, in this preferred embodiment. As shown in detail in FIGS. 9B and 9C, the valve bore 480 extends completely through the valve body 460 to present a pair of open ends 492, 494. A valve member, generally indicated at 496, is movable between predetermined positions within the valve bore 480 to selectively direct pressurized air from the inlet port 482 through the cylinder port 484, as will be described in greater detail below. A pair of end retainer inserts 498 and 500 are received in the pair of open ends 492, 494, respectively, of the valve body 460 and act to retain the valve member 496 within the valve bore 480 as will be described in greater detail below.

The valve member 496 further includes a pair of opposed valve heads 510, 512 disposed at either end of the valve member 496 and at least one valve element 514, 516 formed on the valve member 496 between the valve heads 510, 512. However, in the preferred embodiment illustrated in these figures, a plurality of valve elements 514, and 516 are formed on the valve member 496 and each are operable to selectively direct a flow of pressurized air from the inlet port 482 through the valve bore 480 to the cylinder, or outlet, port 486. The valve member 496 further includes annular grooves 522 that receive o-ring type seals 524, which slidingly engage the central bore openings 526, 528 respectively, of the end retainers 498 and 500 to prevent leakage of the pressurized air within the valve bore 480. In the preferred embodiment, the valve member 496 is an aluminum insert that is over-molded with a suitable resilient material such as rubber, or any known elastomer, in the appropriate places. More specifically, it should be appreciated by those having ordinary skill in the art that the material of the sealing surface may be made of any known composition that is slightly yielding, yet highly resilient, such as nitrile, which may be bonded, or over-molded to the valve element 496.

A biasing member 530, such as a coiled spring, is positioned between the cup-shaped end retainer insert 498 and a recess 532 formed in valve head 510 of the valve member 496. The biasing member 530 applies a constant biasing force against the valve member 496 and to the right as viewed in FIG. 9B.

A plurality of valve seats 534 and 536 are presented in the valve bore 496. The valve seats 534 and 536 cooperate with the valve elements 514 and 516, respectively, to seal the various passages in the valve body 480 as will be discussed in greater detail below. The valve seats 534 and 536 provide a sealing contact with the valve sealing surfaces of the valve elements 514 and 516 when the valve member 496 is in a closed position, relative to a particular outlet port, thereby interrupting the flow of pressurized air to that port.

Of the plurality of valve seats 534 and 536 shown in FIGS. 9B and 9C, valve seat 536 is formed directly in the valve bore 496 itself, while valve seat 534 is disposed upon the end retainer insert 498. The retainer insert 498 and 500 may be adjustably positioned within the valve bore 496 of the valve body 460, having a threadable interaction with the ends 492, 494 or any other suitable portion of the valve bore 496. As discussed above, each of the end retainer inserts 498, 500 has a central bore 526, 528 that receives the opposed heads 510, 512 of the valve member 496 and allows the opposed heads to slidingly move within the valve body 460. Thus, the set position of the end retainer inserts 498, 500 within the valve body 460 controls the sealing of the valve seats with a given linear force applied to the valve member 496. The end retainer insert 498 further includes annular grooves 544 and 546 which receive o-ring type seals 548 to prevent leakage of the pressurized air within the valve bore 480. The valve body 460 further includes an annular groove 566, which receives an o-ring type seal 568 to prevent leakage of the pressurized air between the valve body 460 and the end retainer 500.

In the preferred embodiment, the central bore 528 of end retainer insert 500, which receives the valve head 510 of the valve member 496, also extends fully through the retainer allowing the solenoid assembly, generally indicated at 478, to engage and thereby actuate the valve member 496. As shown for illustration purposes only, this may be accomplished by the use of an actuator pushpin 556 having an enlarged head 558 that extends into the retainer insert 500 to engage and actuate the valve member 496. It should be appreciated by those of ordinary skill in the art that the specific actuating means used to provide motive force to the valve member 496 lies beyond the scope of the present invention. Accordingly, it should be further appreciated that any number of different types of actuating elements, rather than a pushpin, may be employed based on the actuating means used. The solenoid assembly 478 is used to selectively actuate the valve member 496 within the valve bore 480 in the direction opposite to the biasing force of the biasing member 530. In this manner, the solenoid 478 drives the valve member to the left, as shown in FIG. 9C, and the biasing member 530 returns the valve member 496 to its original position (to the right, in FIG. 9B) when the solenoid 478 is deactivated. As noted above, the solenoid assembly 478 may be of any suitable type, for example as described in greater detail in U.S. Pat. No. 6,192,937. Alternatively, the actuator may be an electromagnetic solenoid having a floating armature with lost-motion biasing such as described in prior art U.S. Pat. Nos. 4,438,418 or 3,538,954.

As previously discussed and shown in FIG. 9A, the vacuum regulator valve 20 is in fluid communication with the second vertical inlet passage 306 of the main body 12 at its inlet port 482, and with the second vertical charge passage 332 at its cylinder port 486. In the preferred embodiment, the vacuum regulator valve 20 is configured in a normally closed state. As shown in FIGS. 9A and 9B, with the actuator 462 de-energized and the biasing member 530 influencing the valve member 496 to the right, the valve element 516 is sealingly seated against valve seats 536. Thus, as the incoming negative pressure is delivered through the second inlet 52 and fed through the inlet port 482, it is stopped at the closed valve seat 536. Obviously, valve seat 534 is open at this time, but since cylinder port 484 is blocked this has no effect to the output.

When the actuator 462 is energized and the pushpin 556 drives the valve member 46 to the left, as shown in FIG. 9C, the valve element 516 lifts from valve seats 536, therefore, incoming negative pressure that is delivered through the inlet 52 and fed through the inlet port 482 will now flow past open valve seat 536 and into cylinder port 486 and out the outlet 54. It should be appreciated by those of ordinary skill in the art that the decision to have the vacuum regulator valve operative as either normally open or normally closed is driven by the requirements of the application and is not a limitation of the present invention. In this manner, a source of pressurized air from the second inlet 52 is provided to the outlet 54 through the vacuum regulator valve 20 when the vacuum regulator valve 20 is actuated. A seal between the main body 12 and the vacuum regulator valve 20 is achieved by an elastomeric seal 356 disposed in a groove 358 in the bottom surface 466 of the valve body 460.

It should be appreciated that the use of a single function plate 22 as described in the preferred embodiment of the present invention is non-limiting. The function plate 22 may be additionally embodied as two separate plates so that the valves maybe configured as normally open or normally closed independently. Also, an additional function plate may be used between the vacuum valve 20 and the main body 12 if the application requires that the configuration of the vacuum input be quickly and readily switchable as in the manner of the fill regulator valve 14 and the exhaust valve 16.

It should also be noted that in the preferred embodiment and as illustrated in the figures, the relative valve placement on the main body 12 and their interaction with the internal passages of the main body 12 provides for a greater control and regulation of the positive input pressure as opposed to the negative input pressure. This feature of the present invention is application driven and it should be further appreciated that the placement of the valves 14, 16, and 20 on the main body 12 may be interchanged such that greater control and regulation can be afforded the negative input pressure or that the control and regulation of both pressure inputs are handled equally.

Figure 10:
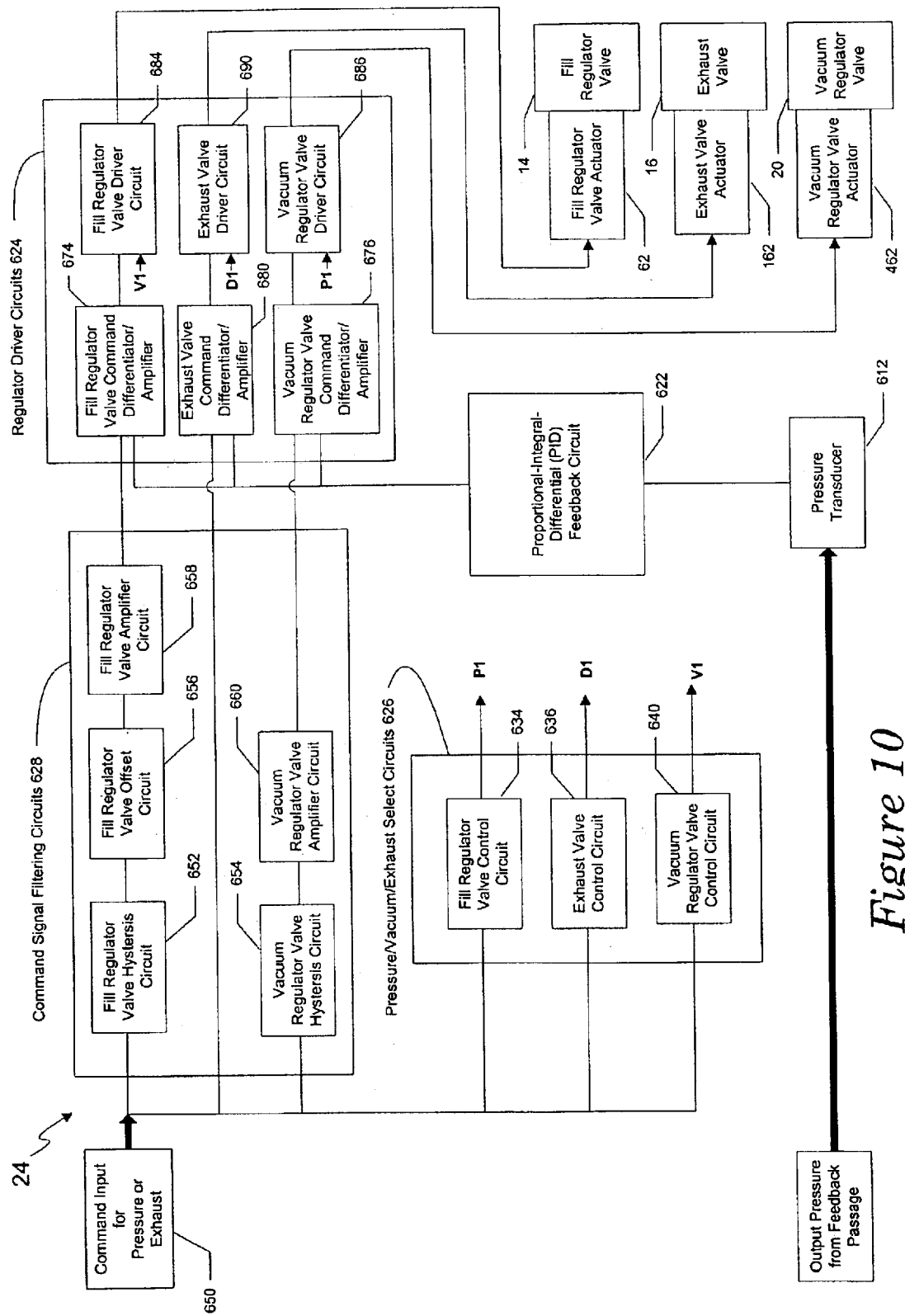
FIG. 10 is a schematic block diagram of the control circuit of the proportional pressure regulator assembly of the present invention.

The operation of the proportional pressure regulator assembly 10 of the present invention is controlled via the control circuit assembly, generally indicated at 24, in the block diagram in FIG. 10. It should be appreciated that the particular electronic circuitry used to accomplish the following described electronic control processes can be composed of any number of different components to achieve the same results, including, but not limited to, full or partially integrated digital circuits comprised of op amps, differentiators, integrators, and the like, or even individual discrete digital or analog components, the particular electronic composition being beyond the scope of the present invention. The control circuit assembly 24 is in electrical communication with the fill regulator valve 14, the exhaust valve 16, and the vacuum regulator valve 20. The control circuit assembly 24 is adapted to receive a command signal 650, then to actuate either the fill regulator valve 14, the exhaust valve 16, or the vacuum regulator valve 20 in response to the command signal. The control circuit assembly 24 is further adapted to receive a feedback signal and to regulate the amount of positive pneumatic pressure through the fill regulator valve 14 or the amount of negative pneumatic pressure through the vacuum regulator valve 20 in response to the feedback signal.

The command signal 650, as a control input, is supplied to the control circuit assembly 24 from the application device as a command request for an output of positive pressure, negative pressure, or exhaust from the proportional pressure regulator 10 of the present invention. It should be appreciated that the command signal 650 is generated by some type of electronic control unit or system command circuitry that is responsible for the overall control of the apparatus or process of which the present invention is merely a part. As such, the actual generation of the command signal 650 is beyond the scope of this invention. The proportional pressure regulator 10 is controlled by a variation of the voltage of the incoming command signal. The command circuit assembly 24 is adapted to respond to variations of the command signal voltage between 0 and 10 volts that is representative of a desired pressure output as described below. As will be discussed below, the command signal 650, as applied to the command circuit assembly 24, will cause only one valve to be open at any one moment. However, in the preferred embodiment, the exhaust valve 16 is used cooperatively and in conjunction with either the fill regulator valve 14 or the vacuum regulator valve 20 to operatively regulate the incoming positive or negative pressure to the desired output pressures, respectively. This feature provides very accurate and highly responsive regulation of the incoming pressures. It should be appreciated by those having ordinary skill in the art that this operative feature is non-limiting and is representative of only one manner of regulation that may (or may not) be employed depending upon the requirements of any particular application.

As best shown in FIG. 6, the control circuit assembly 24 includes a circuit board 610 disposed upon sidewall 32 of the main body 12 and a pressure transducer 612 disposed within a recess 614 on the bottom face 40 of the main body 12 at sidewall 32. The pressure transducer 612 is retained and sealed within the main body 12 by a retainer plate 616 and two o-ring type seals 618 on opposing sides of the pressure transducer 612, as shown. In this manner, the pressure transducer 612 is also disposed in the feedback passage 336 of said main body 12 so as to translate the feedback pressure from the outlet 54 into a feedback signal.

Referring back to FIG. 10, the circuit board 610 includes a proportional-integral-differential feedback circuit 622, regulator driver circuits 624, pressure/vacuum/exhaust select circuits 626, and command signal filtering circuits 628. The pressure/vacuum/exhaust select circuits 626 further include a fill regulator valve control circuit 634, an exhaust valve control circuit 636, and a vacuum regulator valve control circuit 640. The pressure/vacuum/exhaust select circuits 626 are adapted to selectively provide hold-off voltages to the regulator driver circuits 624 to prevent a non-selected valve from operating during the operation of a command selected valve as a safety precaution as will be discussed in greater detail below.

The fill regulator valve control circuit 634, the exhaust valve control circuit 636, and the vacuum regulator valve control circuit 640 are activated and produce the hold-off voltages based on the incoming command input signal 650. The command input signal 650 is provided that varies between 0 and 10 volts DC. Specifically, the range of 0–3 VDC is employed as a command for vacuum, or negative pressure, the range of 4–10 VDC functions as the command for positive pressure, and the range of 3.2 to 3.8 VDC serves as the command for exhaust. Thus, when a command input signal 650 of 4–10 VDC is present, the fill regulator valve control circuit 634 provides the P1 voltage. On the other hand, when a command input signal 650 of 3.2 to 3.8 VDC is present, the exhaust valve control circuit 636 provides the D1 voltage. Finally, when a command input signal 650 of 0 to 3 VDC is present the vacuum regulator valve control circuit 640 provides the V1 voltage. It should be appreciated that the present invention may be controlled by any applicable range of operating voltages other than merely 1 to 10 volts. Additionally, the control of the present invention may also be accomplished by current rather than voltage. For example, the non-limiting embodiment of the present invention described herein is readily adaptable to the use of a current control signal variable between 4 to 20 m.A.

The command signal filtering circuits 628 include the fill regulator valve hystersis circuit 652, and the vacuum regulator valve hystersis circuit 654. The hystersis circuits 652, 654 provide a small delay, or deadband, in the responsiveness of the control circuit assembly 24 to the command input signal 650. This is necessary when a change in the command input signal 650 commands a change in the output from one pressure to the other, or from one pressure to exhaust, so that the actuation of the valves involved does not overlap. Specifically, as mentioned above, with a command input signal 650 that varies between 0 and 10 VDC (0–3 VDC for vacuum, 4–10 VDC for positive pressure, and 3.2–3.8 VDC for atmospheric pressure), the hystersis circuits allow for deadbands in the 3 and 3.2 VDC range and in the 3.8 and 4 VDC range.

The command signal filtering circuits 628 also include a fill regulator valve offset circuit 656, a fill regulator valve amplifier circuit 658, and a vacuum regulator valve amplifier circuit 660. The fill regulator valve offset circuit 656 takes the command input for positive pressure that is in the 410 VDC range and removes the 4 volt offset and sets the input in a corresponding range from 0–6 VDC. The fill regulator valve amplifier circuit 658 then takes this offset corrected signal and opens the voltage range so that the now corresponding command signal for positive pressure will fall within its own 0–10 VDC range. The vacuum regulator valve amplifier circuit 660 opens the voltage range of the command signal for negative pressure between 0 and 3 VDC, so that the now corresponding command signal for negative pressure will fall within its own 0–10 VDC range.

The proportional-integral-differential feedback circuit 622 takes its input from the transducer 612. The transducer 612 is in electrical communication with the proportional-integral-differential feedback circuit 622 on the circuit board 610, and is adapted to provide a feedback signal to the proportional-integral-differential feedback circuit 622 based on its sensing of the output pressure in the feedback passage 366 of the main body 12. The proportional-integral-differential feedback circuit 622 is further adapted to produce a composite feedback signal that is provided to the regulator driver circuits 624. Several electronic processing steps are taken to accomplish this. First, the transducer sensed pressure is converted to a positive voltage using the same 0–10 VDC scale as the command input signal. Specifically, the proportional-integral-differential feedback circuit 622 drives the transducer 612 to provide either a positive or negative voltage based on its sensing of either positive or negative pressure in the feedback passage 366. The transducer 612 output voltage is taken with respect to its measurement span (i.e. its maximum negative output to its maximum positive output) and is offset and converted to a positive voltage using the same 0–10 VDC scale as the command input 650. In other words, the converted transducer voltage is set to correspond to a relative value within 0–3 VDC for sensed vacuum, 4–10 VDC for sensed positive pressure, and 3.2–3.8 VDC for exhausted, or atmospheric pressure.

Second, an offset ground indicative of the value of the command input signal is also provided to the proportional-integral-differential feedback circuit 622, this offset is compared to the converted transducer voltage value to develop an error, or difference, between the transducer sensed pressure and the commanded pressure. Then, this feedback error signal is electronically manipulated to mathematically produce both the instantaneous integral and differential of the error signal's value. Finally, these three values (the error, its integral, and its differential) are summed together to produce the composite error feedback signal that is sent to regulator driver circuits 624. This calculated composite feedback signal is a timed positive voltage that has first, a voltage value representative of the necessary amount of adjustment to drive the regulators to achieve the commanded output, or setpoint (as per the command input), and second, has a specifically calculated duration so as to time the regulator adjustment to avoid overshoot of that setpoint. The composite feedback signal from the proportional-integral-differential feedback circuit 622 is routed to the regulator driver circuits 624.

The regulator driver circuits 624 are adapted to operatively develop the required operating voltage to produce a desired output pressure setpoint in control of the fill regulator valve actuator 62, the exhaust valve actuator 162, or the vacuum regulator valve actuator 462 in response to the command input signal and to regulate the fill regulator valve actuator 62, the exhaust valve actuator 162, or the vacuum regulator valve actuator 462 about the desired setpoint in response to the composite feedback signal from the proportional-integral-differential feedback circuit 622, thus providing regulation of the output pressure about said output pressure setpoint. To this end, each of the regulator driver circuits 624 include a command differentiator/amplifier and a valve driver circuit that control and drive their respective valves. As further shown in FIG. 10, the fill regulator valve command differentiator/amplifier 674 receives the filtered command input signal from the fill regulator valve amplifier circuit 658 and the composite feedback signal from the proportional-integral-differential feedback circuit 622. The fill regulator valve command differentiator/amplifier 674 compares the filtered command input signal to the composite feedback signal. In this manner, the differentiator/amplifier 674 acts as an on/off switch. If the command input for positive pressure is present and the composite feedback of the output is less than the commanded input for pressure, then a drive, or "on", signal is passed to the fill regulator valve driver circuit 684. If the composite feedback is equal to or greater than the command input for positive pressure, or if no positive pressure has been commanded, then the drive signal is "off".

The fill regulator valve driver circuit 684 uses the drive signal from the differentiator/amplifier 674 to turn on, and apply the necessary voltage to, the actuator 62 of the fill regulator valve 14. Additionally, as mentioned above, a voltage input (VI) from the vacuum control circuit 640 is sent to the fill regulator valve driver circuit 684, so that the fill regulator valve 14 is held in an "off" position during periods when the vacuum regulator valve 20 is operating as a safety precaution. Likewise, the exhaust valve driver circuit has an exhaust valve command differentiator/amplifier 680 and an exhaust valve driver circuit 690, and the vacuum regulator valve driver circuit has a vacuum regulator valve command differentiator/amplifier 676 and a vacuum regulator valve driver circuit 690.

In addition, the vacuum regulator valve driver circuit 686 receives a voltage input (PI) from the fill regulator valve control circuit 634 so that the vacuum regulator valve 20 is held in an "off" position during periods when the fill regulator valve 14 is operating as a safety precaution. The exhaust valve driver circuit 690 additionally receives a switchable voltage input (D1) from the exhaust valve control circuit 634 so that the exhaust valve 16 can be manually selected to be held in an "off" position and not used. In this way, the control circuit assembly 24 uses the command input signal 650 to determine the desired setpoint of positive pressure, negative pressure, or exhaust and operates the particular valve necessary to output that desired pressure setpoint, while concurrently processing a feedback signal from the output to regulate the operation of the valves, thus providing regulation of the output pressure about the desired output pressure setpoint.

Figure 11:
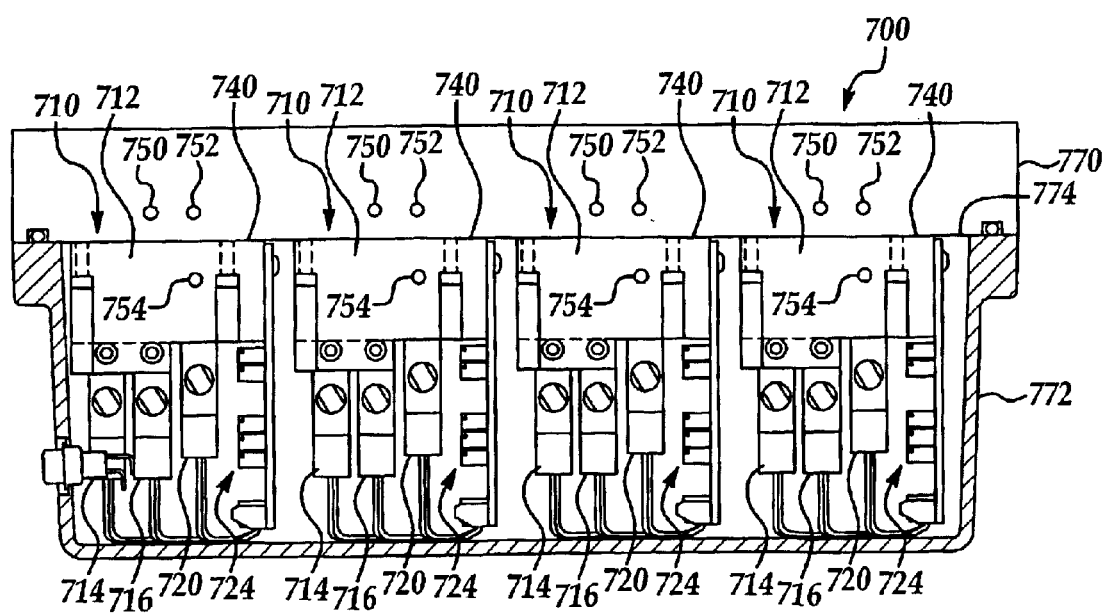
FIG. 11 is a side view of a series of the proportional pressure regulator assemblies of the present invention mounted on a common base.

FIG. 11 depicts an alternate embodiment 700 of the present invention in which a plurality of proportional pressure regulators 710 of the present invention are disposed on a common base 770 with a cover 772. Each proportional pressure regulator 710 has a main body 712, a fill regulator valve 714, an exhaust valve 716, a vacuum regulator valve 720, and a control circuit assembly 724 of like structure as described above. Each of the main bodies 712 of the proportional pressure regulators 710 have an outlet 754 for fluid communication to active pneumatic devices. The common base 770 has a plurality of individual positive and negative pressure inlets, shown as 750 and 752, to provide the sources of pressurized air to each of the main bodies 712 of the proportional pressure regulators 710. It should be appreciated that each of the main bodies 712 of the proportional pressure regulators 710 have internal passages that route the incoming sources of pressurized air, either positive or negative through their bottom surfaces 740 so that they may interact with common inlet passages through the common base at its upper surface 774. It should be further appreciated that the individual outlets 754 may also be routed through the common base 770, and that the common base may also be formed having common interconnected internal inlet passages so that only one connection to the positive and negative pressure sources at one set of inlet ports 750 and 752 is required with the other inlet ports 750, 752 blocked by a suitable plug. It should be further appreciated that the common base 770 and cover 772 may also be formed having the capacity to accept any number of proportional pressure regulators 710 as the particular application would require. This configuration simplifies an application installation in which more than one proportional pressure regulator 10 of the present invention is required in close proximity to one another.

Thus, the present invention simplifies the design of pneumatically actuated systems and overcomes the disadvantages of the conventional pressure regulator designs. The proportional pressure regulator of the present invention accomplishes this, as described in detail above, by having an integrated regulator assembly that provides either a positive pressure, a negative pressure, or exhaust venting capability. In addition, the regulator assembly of the present invention includes a control circuit assembly that dynamically establishes a variable output setpoint in response to a command signal while proportionally regulating the output pressure about the setpoint in response to a feedback signal. This capability finds application in a number of industrial settings where providing a combination of positive pressure, negative pressure, and exhaust capability with accurate regulation are critical. Thus, the proportional regulator assembly of the present invention may be employed, for example, in the manufacture and polishing of silicon wafers for the production of integrated circuits or the production and polishing of disk media, such as hard drive disks, CD-ROMS, and DVDs. The present invention is highly advantageous in these or similar environments where its integrated design simplifies the complex pneumatically actuated systems and allows for smaller, more tightly integrated assemblies, ease of maintenance, and reduced costs. In this way, the proportional regulator assembly of the present invention leads to increased efficiency, accuracy, and cost savings in the production process.

The invention has been described in an illustrative manner. It is to be understood that the terminology, which has been used is intended to be in the nature of words of description rather than of limitation. Many modifications and variations of the invention are possible in light of the above teachings. Therefore, within the scope of the appended claims, the invention maybe practiced other than as specifically described.

We claim:

1. A proportional pneumatic pressure regulator assembly, said assembly comprising:

a main body having a first inlet adapted for fluid communication with a supply of positive pneumatic pressure, a second inlet adapted for fluid communication with a supply of negative pneumatic pressure, at least one outlet adapted for fluid communication with at least one pneumatically actuated device, and an exhaust port;

a fill regulator valve in fluid communication with said first inlet port and said outlet, said fill regulator valve adapted to regulate the supply of positive pressure to a predetermined value from said first inlet through said outlet to a pneumatically actuated device when said fill regulator valve is actuated;

a vacuum regulator valve in fluid communication with said second inlet port and said outlet, said vacuum regulator valve adapted to regulate the supply of negative pressure to a predetermined value from said second inlet through said outlet to a pneumatically actuated device when said vacuum regulator valve is actuated;

an exhaust valve in fluid communication with said outlet and operable to exhaust pressure from said outlet through said exhaust port when said exhaust valve is actuated;

a control circuit assembly in electrical communication with said fill regulator valve, said vacuum regulator valve, and said exhaust valve, said control circuit assembly adapted to receive a command signal to actuate either said fill regulator valve, said vacuum regulator valve, or said exhaust valve in response to the command signal, said control circuit assembly further adapted to receive a feedback signal and to regulate the amount of positive pneumatic pressure through said fill regulator valve or the amount of negative pneumatic pressure through said vacuum regulator valve in response to the feedback signal.

2. A proportional pneumatic pressure regulator assembly as set forth in claim 1 wherein said main body further includes a function plate disposed between said main body, and said fill regulator valve and said exhaust valve, said function plate having internal passages providing fluid communication between said first inlet and said fill regulator valve, and between said outlet and said exhaust valve, such that the orientation of said function plate within said main body predetermines whether said fill regulator valve and said exhaust valve are either normally open or normally closed.

3. A proportional pneumatic pressure regulator assembly as set forth in claim 1 wherein said main body further includes an internal feedback passage in fluid communication with said at least one outlet to provide a feedback pressure to said control circuit assembly.

4. A proportional pneumatic pressure regulator assembly as set forth in claim 1 wherein said fill regulator valve includes an actuator having a solenoid and a return spring, said actuator operable to selectively move said fill regulator valve from a first position to a second position in response to said solenoid being energized by said control circuit assembly, said actuator being further operable to move said fill regulator valve back from the second position to the first position by action of said return spring in response to said solenoid being de-energized.

5. A proportional pneumatic pressure regulator assembly as set forth in claim 1 wherein said vacuum regulator valve includes an actuator, said actuator having a solenoid and a return spring, said actuator operable to selectively move said vacuum regulator valve from a first position to a second position in response to said solenoid being energized by said control circuit assembly, said actuator being further operable to move said vacuum regulator valve back from the second position to the first position by action of said return spring in response to said solenoid being de-energized.

6. A proportional pneumatic pressure regulator assembly as set forth in claim 1 wherein said exhaust valve includes an actuator, said actuator having a solenoid and a return spring, said actuator operable to selectively move said exhaust valve from a first position to a second position in response to said solenoid being energized by said control circuit assembly, said actuator being further operable to move said exhaust valve back from the second position to the first position by action of said return spring in response to said solenoid being de-energized.

7. A proportional pneumatic pressure regulator assembly as set forth in claim 1 wherein said control circuit assembly includes a circuit board and a pressure transducer, said circuit board further including a proportional-integral-differential feedback circuit, regulator driver circuits, pressure/vacuum/exhaust select circuits, and command signal filtering circuits, said control circuit assembly adapted to receive control and feedback signals and operatively control the actuation of said fill regulator valve, said vacuum regulator valve and said exhaust valve.

8. A proportional pneumatic pressure regulator assembly as set forth in claim 7 wherein said transducer of said control circuit assembly is disposed in said feedback passage of said main body so as to translate the feedback pressure from said at least one outlet into a feedback signal.

9. A proportional pneumatic pressure regulator assembly as set forth in claim 8 wherein said transducer of said control circuit assembly is in electrical communication with said proportional-integral-differential feedback circuit on said circuit board, said transducer adapted to provide the feedback signal to said proportional-integral-differential feedback circuit, said proportional-integral-differential feedback circuit adapted to produce a composite feedback signal that is provided to said regulator driver circuits.

10. A proportional pneumatic pressure regulator assembly as set forth in claim 7 wherein said regulator driver circuits include a fill regulator valve driver circuit, a vacuum regulator valve driver circuit, and an exhaust valve driver circuit, said driver circuits adapted to operatively develop the required operating voltage to produce a desired output pressure setpoint by controlling said fill regulator valve actuator, said vacuum regulator valve actuator, or said exhaust valve actuator in response to said command input signal and also regulating said fill regulator valve actuator, said vacuum regulator valve actuator, or said exhaust valve actuator about the desired output pressure setpoint in response to said composite feedback signal from said proportional-integral-differential feedback circuit, thus providing regulation of the output pressure about the desired output pressure setpoint.

11. A proportional pneumatic pressure regulator assembly as set forth in claim 10 wherein said pressure/vacuum/exhaust select circuits include a fill regulator valve control circuit, a vacuum regulator valve control circuit, and an exhaust valve control circuit, said pressure/vacuum/exhaust select circuits adapted to selectively provide hold-off voltages to either said fill regulator valve driver circuit, said vacuum regulator valve driver circuit, or said exhaust valve driver circuit in response to the received command signal to individually actuate either said fill regulator valve, said vacuum regulator valve, or said exhaust valve such that a non-selected valve is prevented from operating during the operation of a command selected valve as a safety precaution.

12. A proportional pneumatic pressure regulator assembly, said assembly comprising:
   a main body;
   a fill regulator valve supported upon said main body;
   a vacuum regulator valve supported upon said main body;
   an exhaust valve supported upon said main body; and
   a control circuit assembly in electrical communication with said fill regulator valve, said vacuum regulator valve, and said exhaust valve, said control assembly adapted to receive a command signal and actuate either said fill regulator valve, said vacuum regulator valve, or said exhaust valve in response to the command signal, said control circuit assembly further adapted to receive a feedback signal and regulate the amount of positive pneumatic pressure through said fill regulator valve and the amount of negative pneumatic pressure through said vacuum regulator valve in response to the feedback signal.

13. A proportional pneumatic pressure regulator assembly as set forth in claim 12 wherein said fill regulator valve, said vacuum regulator valve, and said exhaust valve each include a separate actuator, each of said separate actuators having a solenoid and a return spring and operable to selectively move their respective valve from a first position to a second position in response to said solenoid being energized by said control circuit assembly, each of said separate actuators being further operable to move their respective valve back from the second position to the first position by action of said return spring in response to said solenoid being de-energized.

14. A proportional pneumatic pressure regulator assembly as set forth in claim 12 wherein said control circuit assembly includes a circuit board and a pressure transducer, said transducer operative to provide a feedback pressure signal to said control circuit board, said circuit board further including regulator driver circuits, pressure/vacuum/exhaust select circuits, command signal filtering circuits, and a proportional-integral-differential feedback circuit adapted to receive and process the feedback pressure signal into a composite feedback signal.

15. A proportional pneumatic pressure regulator assembly as set forth in claim 14 wherein said regulator driver circuits include a fill regulator valve driver circuit, a vacuum regulator valve driver circuit, and an exhaust valve driver circuit, said driver circuits adapted to operatively develop the required operating voltage to produce a desired output pressure setpoint by controlling said fill regulator valve actuator, said vacuum regulator valve actuator, or said exhaust valve actuator in response to said command input signal and also regulating said fill regulator valve actuator, said vacuum regulator valve actuator, or said exhaust valve actuator about the desired output pressure setpoint in response to said composite feedback signal from said proportional-integral-differential feedback circuit, thus providing regulation of the output pressure about the desired output pressure setpoint.

16. A proportional pneumatic pressure regulator assembly as set forth in claim 15 wherein said pressure/vacuum/exhaust select circuits include a fill regulator valve control circuit, a vacuum regulator valve control circuit, and an exhaust valve control circuit, said pressure/vacuum/exhaust select circuits adapted to selectively provide hold-off voltages to either said fill regulator valve driver circuit, said vacuum regulator driver valve, or said exhaust valve driver circuit in response to the received command signal to individually actuate either said fill regulator valve, said vacuum regulator valve, or said exhaust valve thereby preventing a non-selected valve from operating during the operation of a command selected valve as a safety precaution.

17. A proportional pneumatic pressure regulator assembly comprising:
   a main body;
   a fill regulator valve supported upon said main body;
   a vacuum regulator valve supported upon said main body;
   an exhaust valve supported upon said main body; and
   an electronic control circuit, said electronic control circuit being in electrical communication with said fill regulator valve, said vacuum regulator valve, and said exhaust valve, and adapted to receive a command signal and actuate either said fill regulator valve, said vacuum regulator valve, or said exhaust valve, and further adapted to receive a feedback signal and to proportionally regulate the output pressure as determined from the command signal.

18. An electronic control circuit of a proportional pneumatic pressure regulator assembly as set forth in claim 17 wherein said electronic control circuit further includes a proportional-integral-differential feedback circuit, regulator driver circuits, pressure/vacuum/exhaust select circuits, and command signal filtering circuits, said proportional-integral-differential feedback circuit adapted to produce a composite feedback signal that is provided to said regulator driver circuits.

19. An electronic control circuit of a proportional pneumatic pressure regulator assembly as set forth in claim 18, wherein said regulator driver circuits include a fill regulator valve driver circuit, a vacuum regulator valve driver circuit, and an exhaust valve driver circuit, said driver circuits adapted to operatively develop the required operating voltage to produce a desired output pressure setpoint by controlling the fill regulator valve actuator, said vacuum regulator valve actuator, or said exhaust valve actuator in response to said command input signal and also regulating said fill regulator valve actuator, said vacuum regulator valve actuator, or said exhaust valve actuator about the desired output pressure setpoint in response to said composite feedback signal from said proportional-integral-differential feedback circuit, thus providing regulation of the output pressure about the desired output pressure setpoint.

20. A proportional pneumatic pressure regulator assembly as set forth in claim 19 wherein said pressure/vacuum/exhaust select circuits include a fill regulator valve control circuit, a vacuum regulator valve control circuit, and an exhaust valve control circuit, said pressure/vacuum/exhaust select circuits adapted to selectively provide hold-off voltages to either said fill regulator valve driver circuit, said vacuum regulator valve driver circuit, or said exhaust valve driver circuit in response to the received command signal to individually actuate either said fill regulator valve, said vacuum regulator valve, or said exhaust valve such that a non-selected valve is prevented from operating during the operation of a command selected valve as a safety precaution.

* * * * *